United States Patent [19]

Lach et al.

[11] Patent Number: 4,670,844

[45] Date of Patent: Jun. 2, 1987

[54] TRAFFIC CONTROL SYSTEM FOR DRIVE-IN BANKS

[75] Inventors: Ronald L. Lach, Arlington Heights; Randall R. Welton, Carpentersville, both of Ill.

[73] Assignee: Actron, Inc., Elk Grove Village, Ill.

[21] Appl. No.: 657,486

[22] Filed: Oct. 3, 1984

[51] Int. Cl.[4] .......... G06F 15/48

[52] U.S. Cl. .......... 364/436; 340/51; 340/933; 194/902

[58] Field of Search .......... 364/464, 436, 437; 377/9; 340/51, 933, 928; 194/901, 902; 235/379, 384

[56] References Cited

U.S. PATENT DOCUMENTS

| | | | |
|---|---|---|---|
| 3,206,722 | 9/1965 | Gustus et al. | 340/51 |
| 3,549,869 | 12/1970 | Kuhn | 340/51 |
| 3,575,586 | 4/1971 | Kroll | 235/384 |
| 3,588,808 | 6/1971 | Gustus | 340/51 |
| 3,663,936 | 5/1972 | Boudouris et al. | 340/51 |
| 3,886,414 | 5/1975 | Lach et al. | 340/51 |
| 4,010,404 | 3/1977 | Lach | 340/51 |

*Primary Examiner*—Gary Chin

*Attorney, Agent, or Firm*—Hill, Van Santen, Steadman & Simpson

[57] ABSTRACT

A novel drive-in traffic control for a bank which includes a computer for controlling the various signs, teller stations, supervisor's desk panel, sensors and a printer and which has provisions for allowing various timing to be varied with a number of control switches. Furthermore, additional teller stations and additional waiting lanes of cars can be added without rewiring the computer terminal and only additional modular wiring units need be added so as to allow additional elements and stations to be added.

12 Claims, 17 Drawing Figures

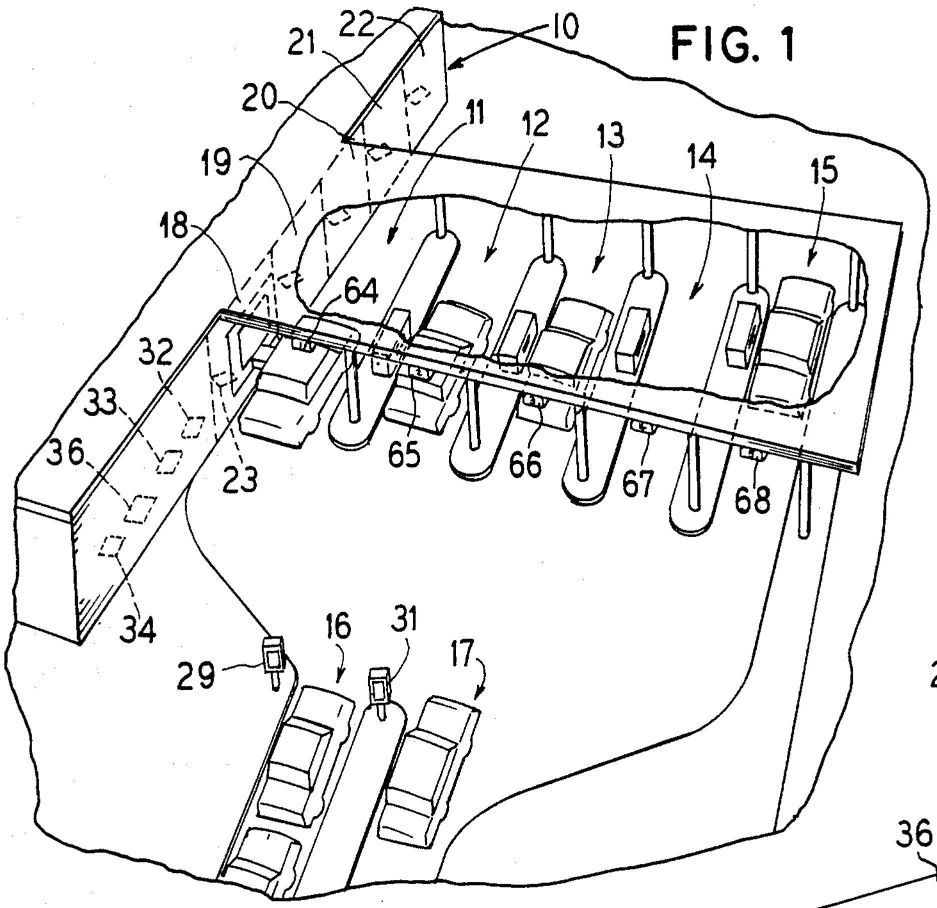
FIG. 1
FIG. 2
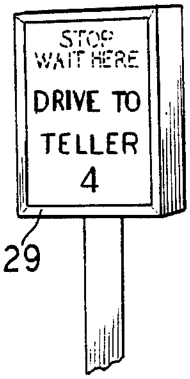
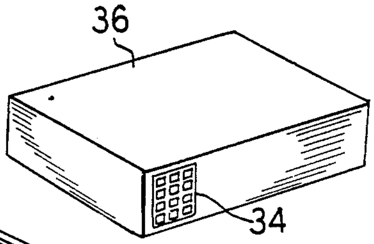
FIG. 6
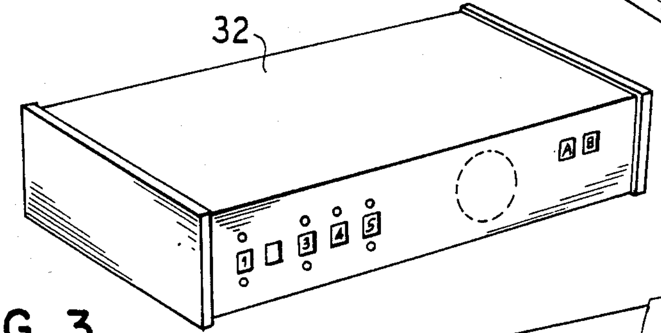
FIG. 3
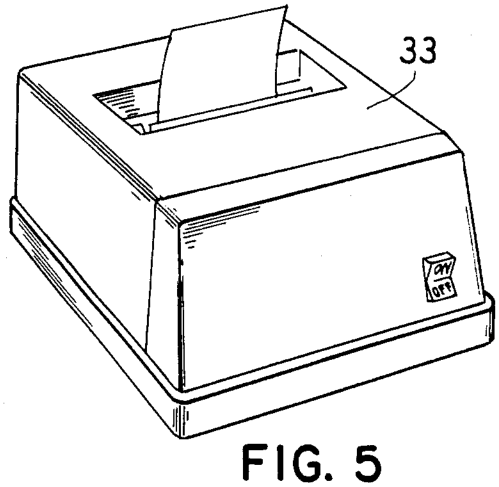
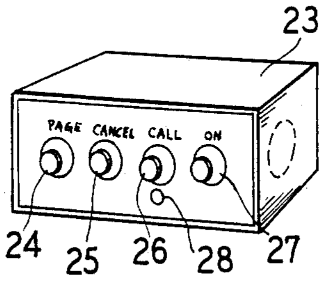
FIG. 4
FIG. 5

TRAFFIC CONTROL SYSTEM FOR DRIVE-IN BANKS

BACKGROUND OF THE INVENTION

1. Field of the Invention

This invention relates in general to electronic control systems for controlling the movement of traffic in a drive-in bank so that the vehicles will be processed in the order of arrival at the bank.

2. Description of the Prior Art

Prior art U.S. Pat. Nos. 3,588,808, 3,206,722, 3,886,414 and 4,010,404 disclose traffic control systems for drive-in banks which operate using stepping switches to control and direct the flow of traffic from the waiting line or lines to one or more teller positions.

SUMMARY OF THE INVENTION

The present invention relates to an improved microprocessor controlled traffic control system which controls one or multiple lanes of cars as they arrive at the bank and can sense the presence of cars and then direct them to open teller positions in the order of which they arrive in the multiple lanes, thus, if the first went to the second, it would be dispatched before cars later arriving in any other lanes.

The present invention also provides for a print-out which provides management information which is accumulated automatically and which gives information such as time open to each station, time with customers, the number of customers, the average time per customer and the percentage time busy for each of the tellers.

A detector at each station and at each lane sign senses the presence of cars and feeds into the computer system. A supervisor monitoring panel is provided such that a supervisor can monitor the flow and activities of the tellers from a central location.

The present invention allows the addition of additional lanes and/or additional tellers by simply adding wiring which is in a serial link and one cable from the processor feeds through each teller station and a large number of teller stations can be simply and easily added by merely adding modular wiring to the existing system for each teller station as, for example, up to twenty-four teller stations. Also, the automobile dispatching lane controls are wired such that additional lanes can be provided and neither adding stations or dispatchers requires wiring at the central station since such wires are merely added on for each additional station and dispatcher.

The present invention provides for adjustable times for various functions, as for example, if a dispatcher station instructs a car to go to teller station 3 and the car instead goes to teller station 2, then in the present invention a new call to an additional car to go to teller station 3 occurs after a switch adjustable time which might be 30 or 45 seconds.

The invention also provides a second adjustable timer which can adjust the time in a situation where if a car was told to go to station 3 and he went to station 2 which is busy, then there would be a time delay before a new call is placed for another car at station 2 after it becomes available. A third adjustable timer controls the situation where with multiple lanes if a car stalls the prior art systems kept telling the stalled car to advance to a teller station. In the present invention, after an adjustable time delay, if the car in the lane is advised to go to a teller station and cannot respond due to being stalled or some similar reason then the message will go to the next arriving car in another lane. A fourth adjustable timer operates for multiple lane systems such that display times between displays is controlled so that cars do cross paths at the same time. The teller stations have an illuminated lane number which flashes if the car is directed to it and which stops flashing when the car arrives. The lane number automatically turns on when the teller presses her station on switch.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a perspective view of the vehicle control system for a drive-in bank;

FIG. 2 is a sign for controlling the vehicles waiting in one or more lines to the teller stations;

FIG. 3 is a supervisor control unit;

FIG. 4 is a teller control unit;

FIG. 5 is a printer used in the system;

FIG. 6 is a keyboard used in the system;

DESCRIPTION OF THE PREFERRED EMBODIMENTS

Figure 7:
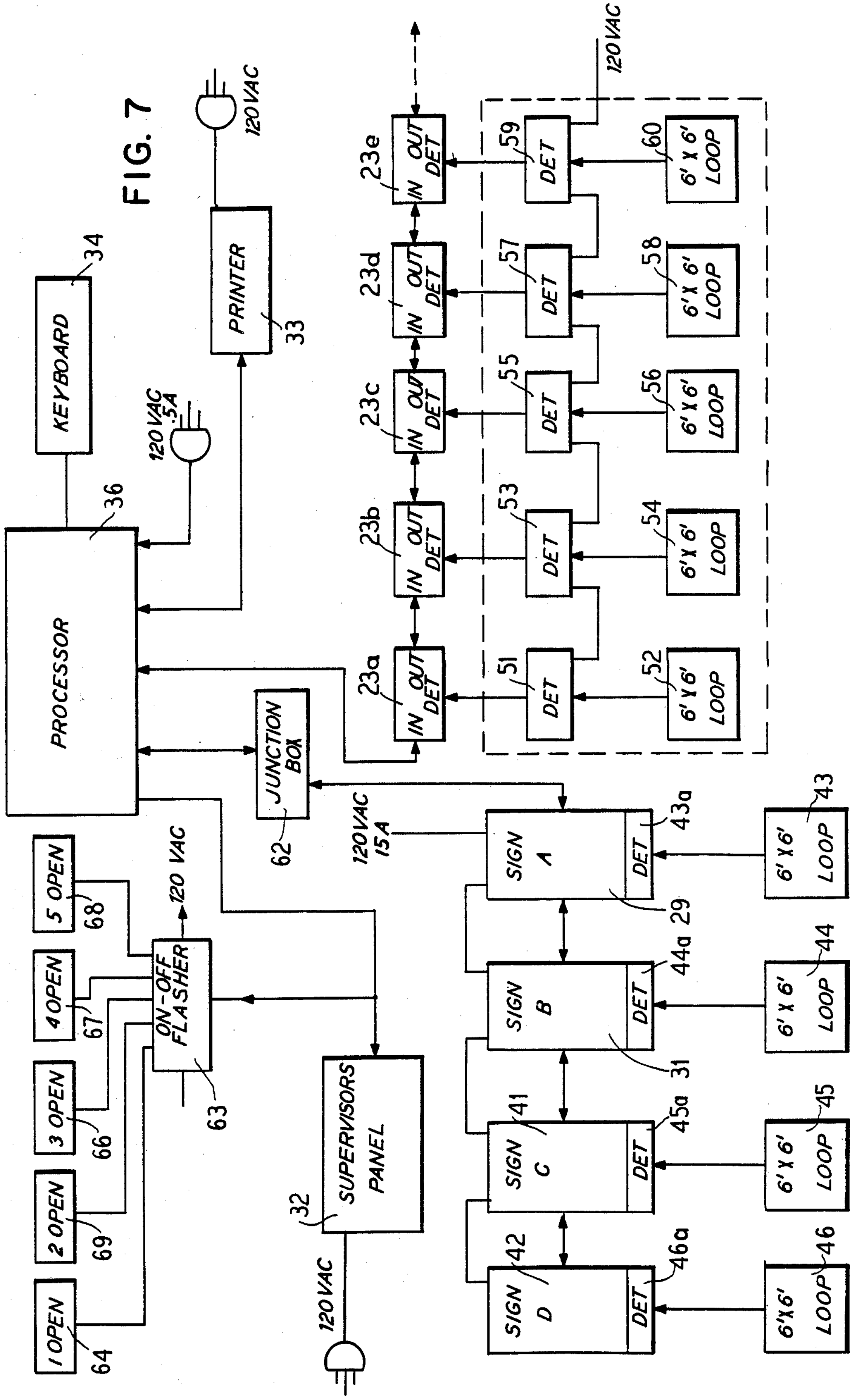
FIG. 7 is a general block diagram of the traffic control system of the invention.

FIG. 1 illustrates a traffic control system for a drive-in bank wherein the bank 10 is provided with a number of drive-in stations 11, 12, 13, 14 and 15 wherein cars may be directed so that the occupants can transact banking business with the bank 10. One or more waiting lanes 16 and 17 are provided from which the cars are directed to open teller car stations 11 through 15 by teller director means 29 and 31. A number of teller stations 18, 19, 20, 21 and 22 are provided. Each teller station is associated with one of the teller car stalls 11 through 15 and each teller has a control unit 23 such as illustrated in FIG. 4 which has a page button 24, a cancel button 25, a call button 26 and an ON button 27 as well as an indicator light 28. A microprocessor unit 36 is mounted in the bank 10 and is connected to the various elements of the invention as well as to a printer 33 illustrated in FIG. 5 and a supervisory station 32 illustrated in FIG. 3, a keyboard 34 illustrated in FIG. 6 as well as to the director units 29 and 31. Above each of the teller lanes 11 through 15 are indicator signs 64 through 68 which are also connected in the system.

FIG. 7 is a general block diagram of the system and illustrates the microprocessor unit 36 connected to the keyboard 34 as well as to the supervisor's panel 32 and to the indicator lights 64 through 68 through a flasher 63. The teller control unit such as 23 (*a–e*) are connected to the microprocessor 36 and are each provided with a detector 51 and a loop 52 for detecting vehicles in the detector lanes 11 through 15. For example, the detector 53 and loop 54 are connected to teller control units 23*b*, the detector 55 and the loop 56 are connected to the teller control unit 23*c*, the detector 57 and the loop 58 are connected to the teller control unit 23*d* and the teller control unit 23*e* is connected to a detector 59 and a loop 60. Indicator signs such as the indicator signs 29 and 31 as well as additional indicator signs 41 and 42 for additional lanes are connected to the microprocessor 36 through a junction box 62 and each have detectors 43*a* and detector loops 43 which sense the presence of vehicles in the respective waiting lanes. The sign 31 has a detector 44*a* and a detector loop 44, the sign 41 has a detector 45*a* and a detector loop 45, the sign 42 has a detector 46*a* and a detector loop 46, for example.

Figure 8:
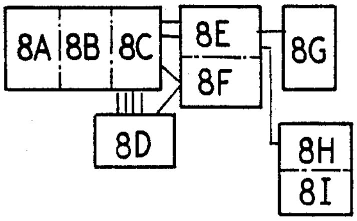
FIG. 8 is a map illustrating how FIGS. 8A through 8I fit together.
Figure 8A:
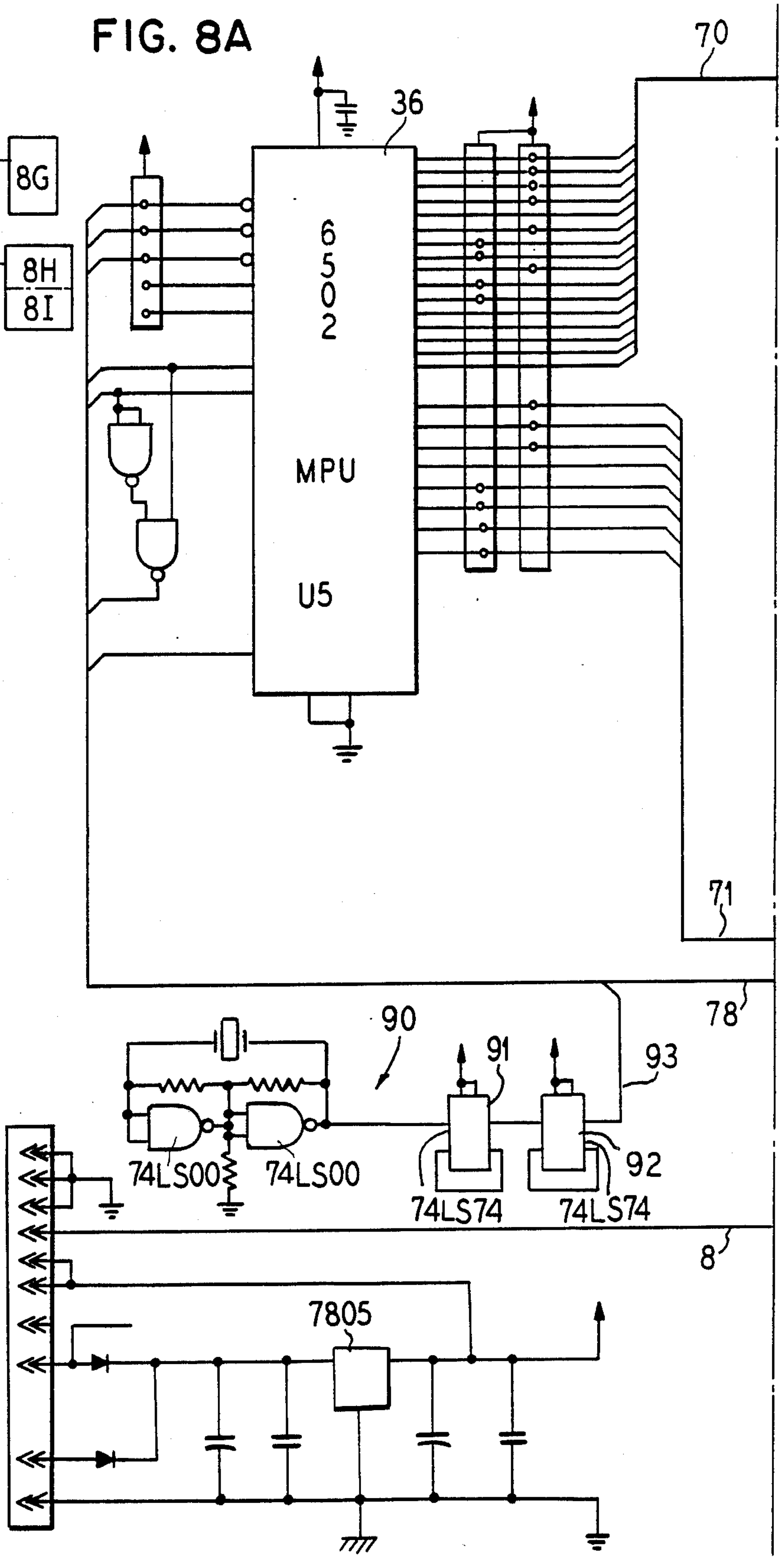
FIGS. 8A through 8I comprise an electrical schematic of the invention.

FIGS. 8A through 8I comprise the electrical schematic of the invention and FIG. 8 illustrates how the FIGS. 8A through 8I fit together.

Figure 8B:
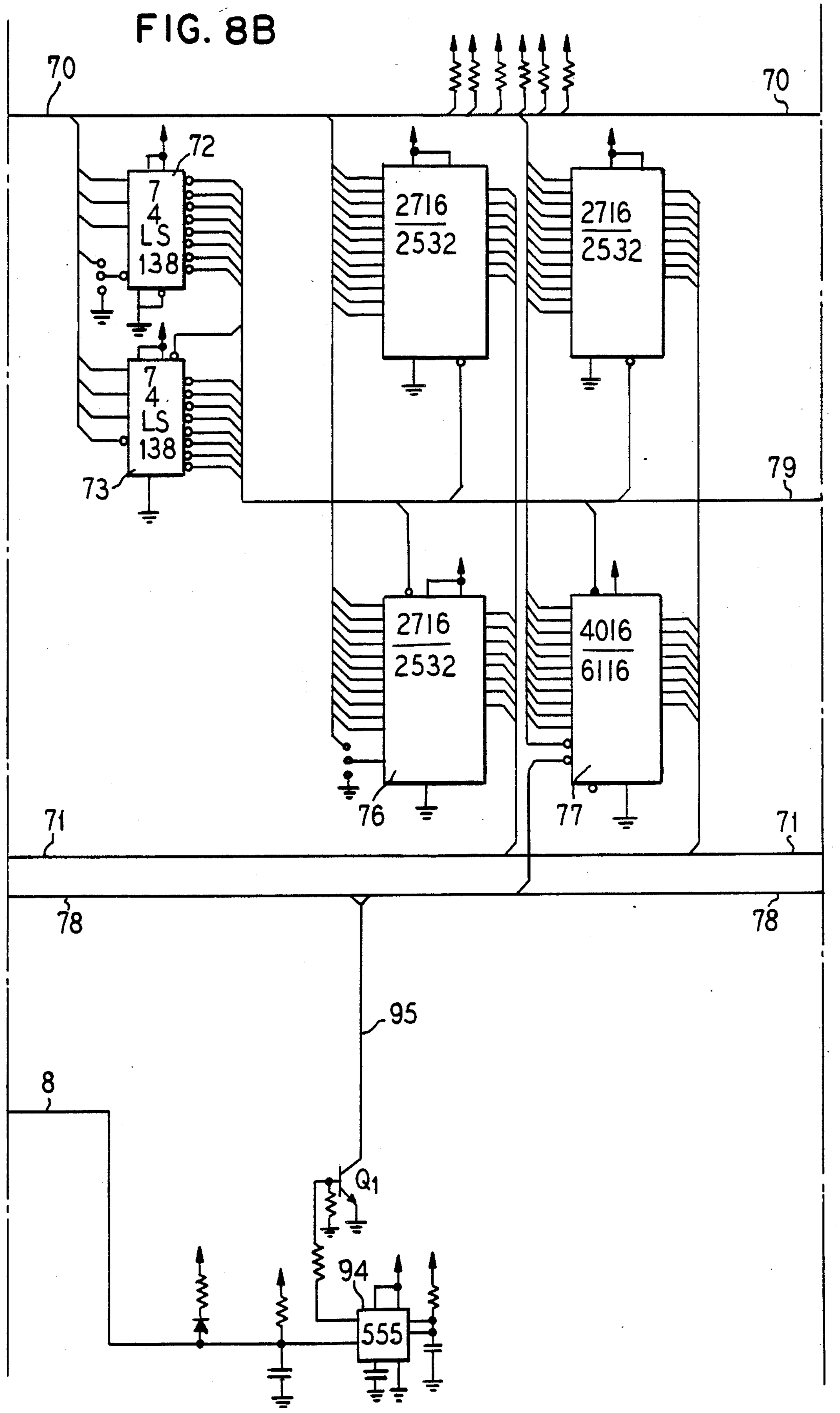

A microprocessor 36 which might be a type 6502 receives input from a clock source 90 which includes a crystal and two type 74L 500's which supplies an input on lead 93 through two type 74LS74s. The microprocessor 36 is connected by address bus 70, data bus 71, control bus 78 to the elements illustrated on FIG. 8B which includes a pair of 74LS138s designated by numerals 72 and 73 and three type 2716/2532s designated 74, 75 and 76 as well as a type 4016/6116 designated 77. A reset lead 95 is connected to the control bus 78 from transistor Q1 which might be a type 2N 4401 which receives an input from a type 555 designated 94 which receives an input 8 from an external reset control. FIG. 8B is connected to FIG. 8C which comprises an input/output element and the buses 70, 79, 71 and 78 are connected to three type 6522s designated by numerals 96, 97 and 98, as well as to output connectors 7, 109, 110 and 111. Output connector 7 is connected to the switches 101 through 108 illustrated in FIG. 8D and to a type 74154 designated by numeral 100. A five pin molex 171 also is connected to the switches. The switches 101 through 108 each have a plurality of switches such as switches 107*a* which can be manually set to establish different timings in the invention for varying the delay times of certain functions such as described in the operation of the invention.

Figure 8C:
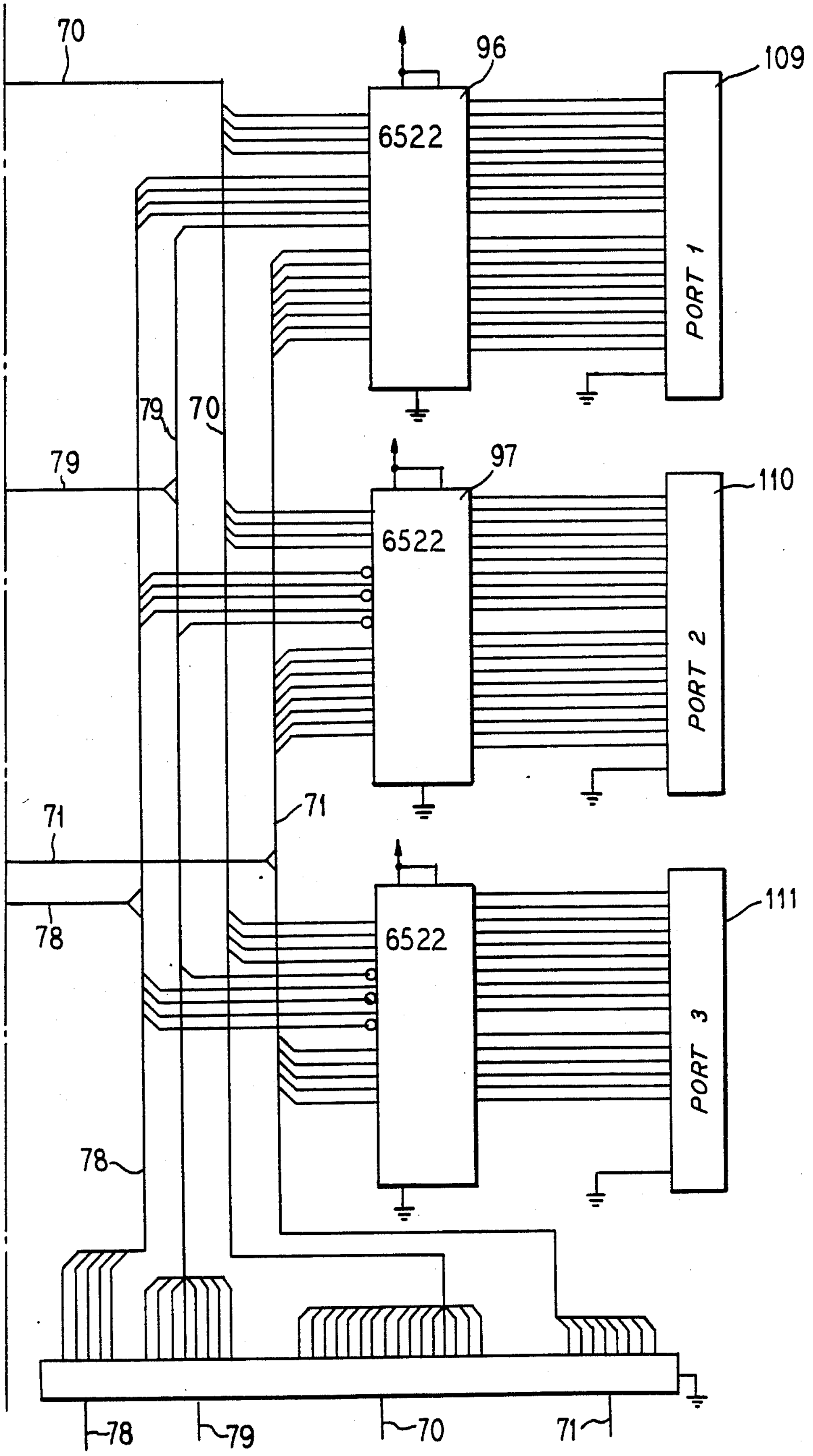
Figure 8D:
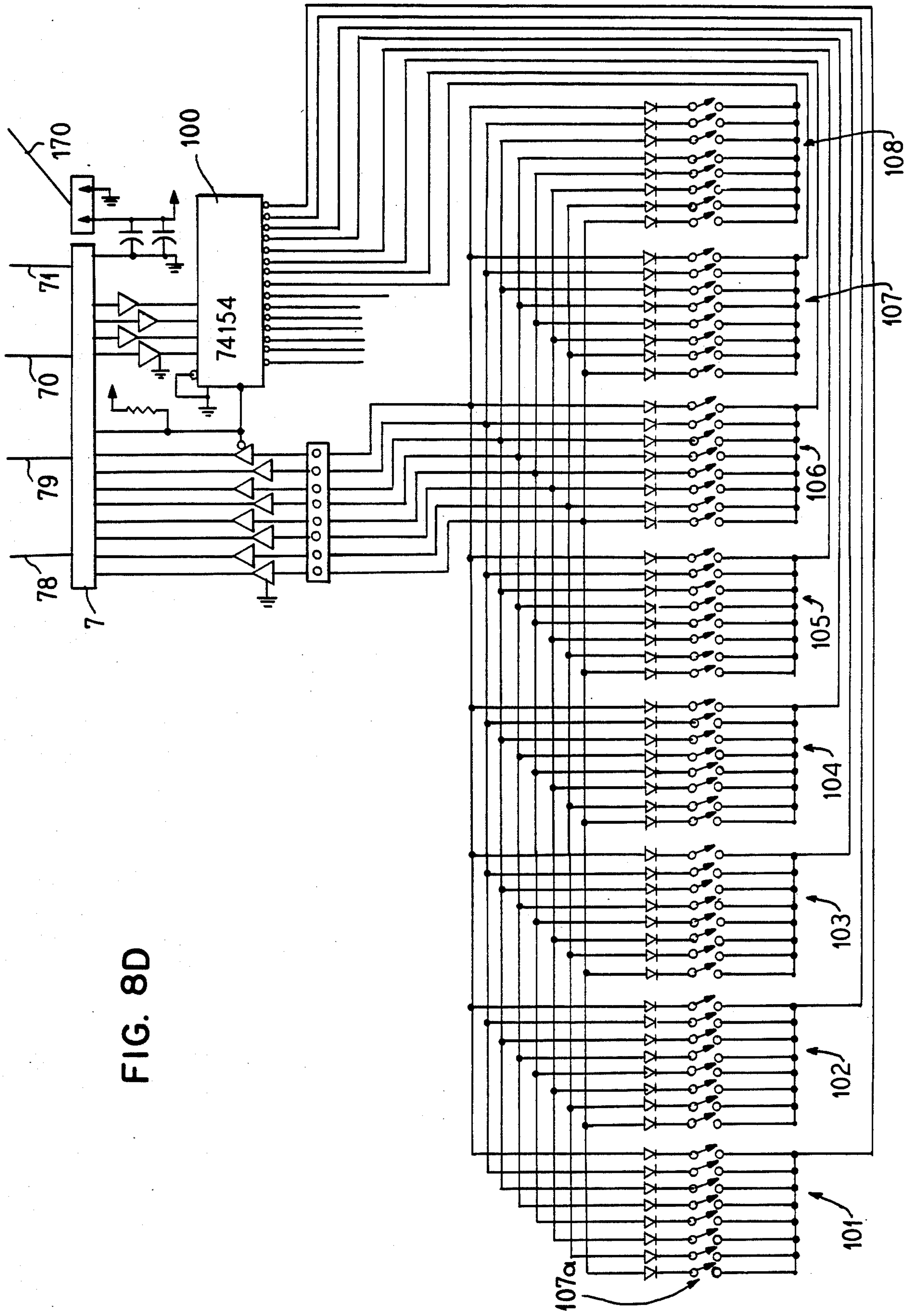
Figure 8E:
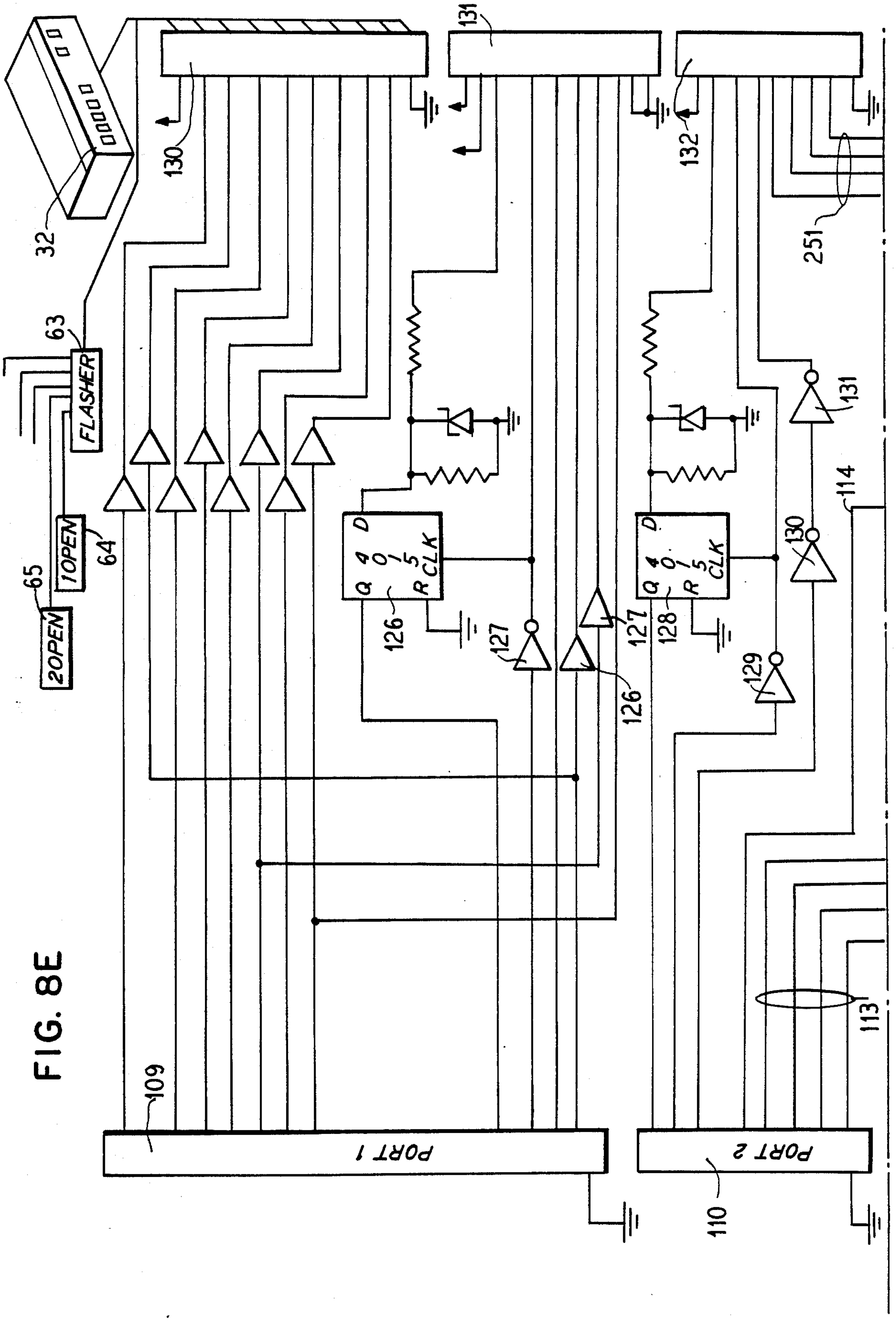
Figure 8F:
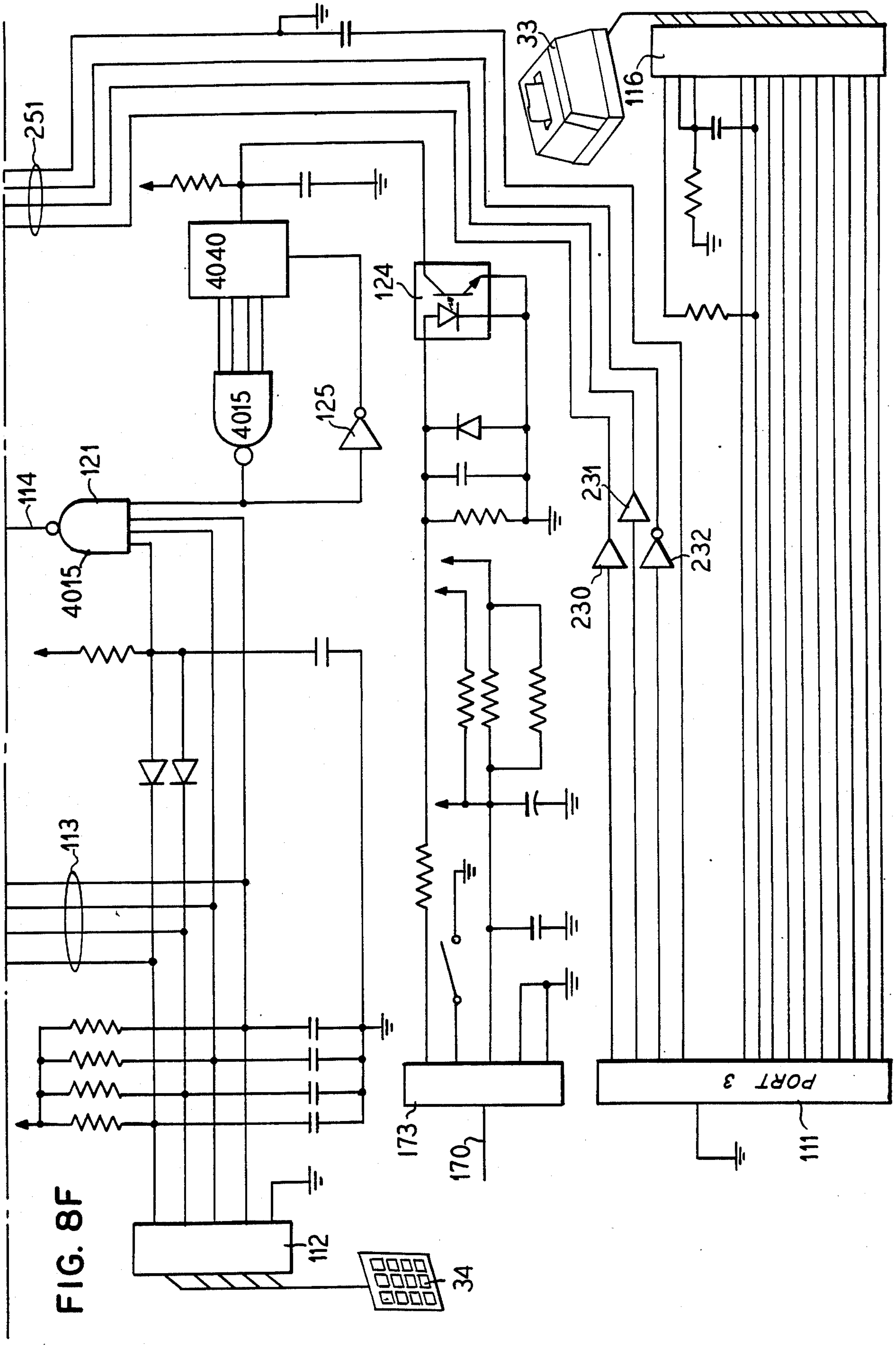
Figure 8G:
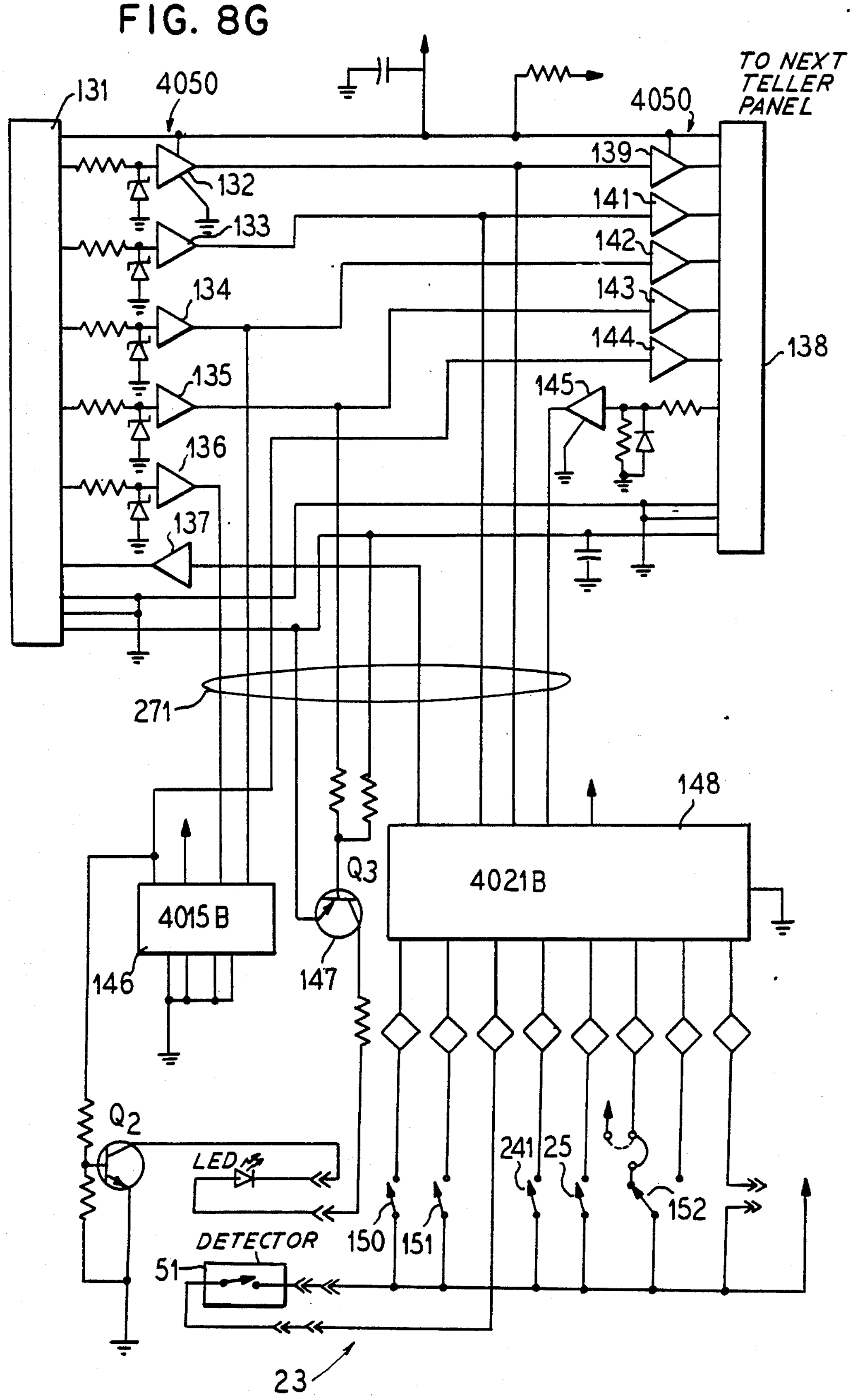

The output ports 109 and 110 from FIG. 8C are connected to FIG. 8E as illustrated and port 109 is connected through a number of type 4050s to an output terminal 130 which is connected to the supervisor control terminal 32 as well as to flasher unit 63 and indicator lights 64 through 68 which are above the teller lane stations 11 through 15. Port 109 is also connected to a teller control output terminal 131 through a type 4015 designated by numeral 126 and a type 4049 127 and to gates 126 and 127. An output terminal 132 controls the dispatcher unit 29 and receives input from input terminal 110 through a type 4015 128 and three type 4049s, 129, 130 and 131 as shown. As shown in FIGS. 8E and 8F, certain leads 113 from port 110 connect to a keyboard input terminal 112 which is connected to the keyboard 34. Lead 114 from port 110 connects to a type 4015, 121 which is connected to keyboard port 112 and to a type 4015, 122 which receives the output of a type 4040, 123. A type 4049, 125 is connected between the element 122 and 123 as shown. A five pin molex connector 173 is connected by cable 170 to connector 172 in FIG. 8D and through a type 4N2B to element 123. Port 3, 111 from FIG. 8C is connected to an output port 116 for the printer 33 and also supplies an output through gates 230 and 231 which may be type 4050s and a gate 232 which may be a type 4049 to cable 251 which is connected to output terminal 132 illustrated in FIG. 8E and which supplies connection to the automobile guiding sign 29 at the line of waiting vehicles. As is illustrated in FIG. 8G, the teller control stations 23 have an input terminal 131 which is connected to the terminal 131 illustrated in FIG. 8E which are connected through a number of gates 132 through 137 which might be type 4050s to an output connector 138 through gates 139 through 145 which may be type 4040s. A particular teller station 23 is connected by a cable 271 to the gates 132 through 137 and to the input terminal 131 and the teller control has a number of switches such as open switch 150, a manual switch 151, a paging switch 241, a cancel switch 25, an auto switch 151 and to a type 4021B designated by numeral 148 which is connected to a portion of the cable 271. A detector 51 which detects the presence of a car at the teller station associated with the particular teller control 23 supplies an input to the switches as shown. A transistor Q2 is connected to a transistor Q3 through an LED and is connected to the cable 271 as shown.

It is to be realized that additional teller control stations can be connected by merely connecting an identical teller control into the output terminal 138 for the next teller control and so on as many as desired, so only the wiring illustrated in FIG. 8G is required for each teller control station and the central wiring of the computer need not be changed for adding additional stations.

Figure 8H:
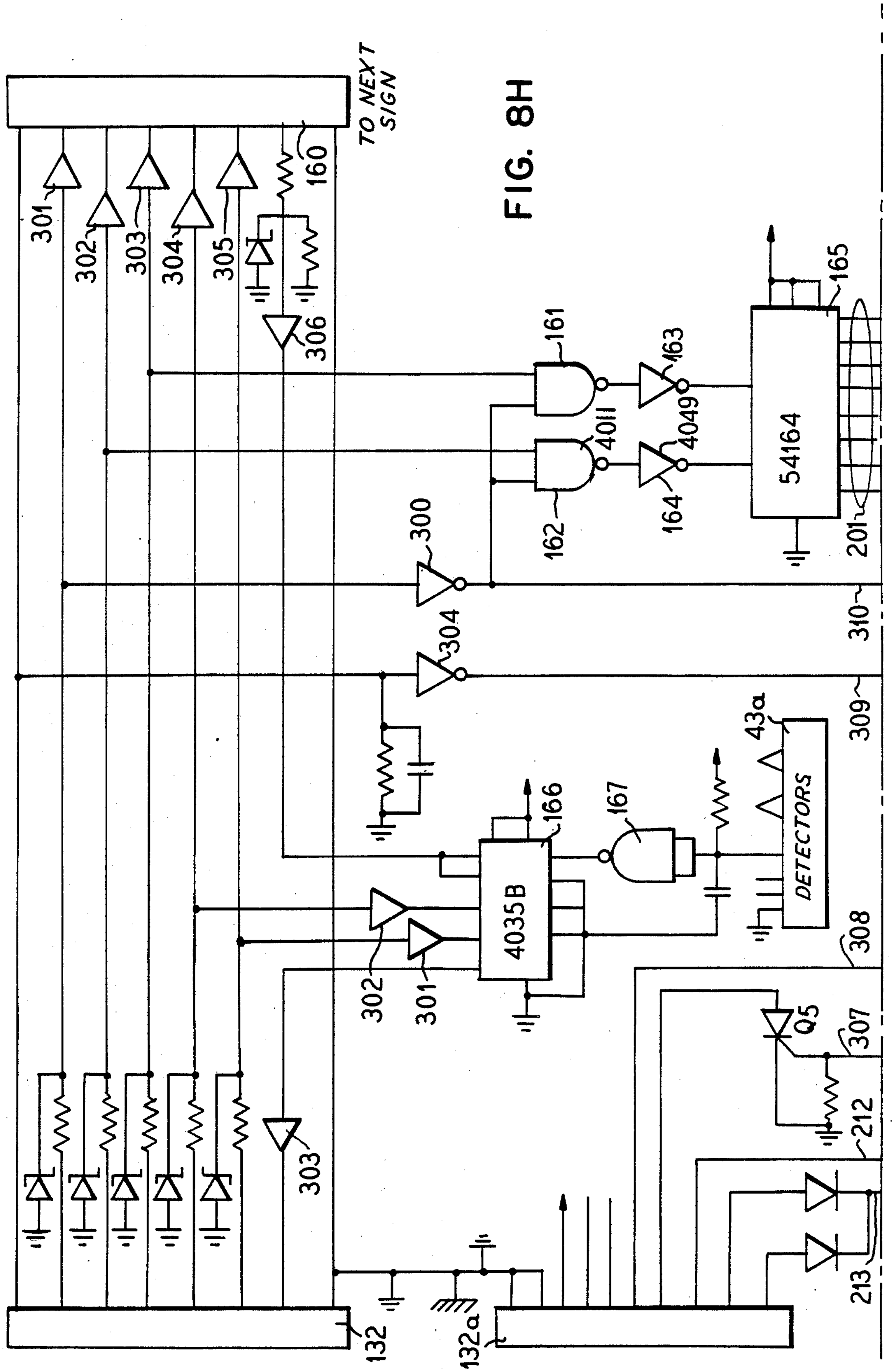
Figure 8I:
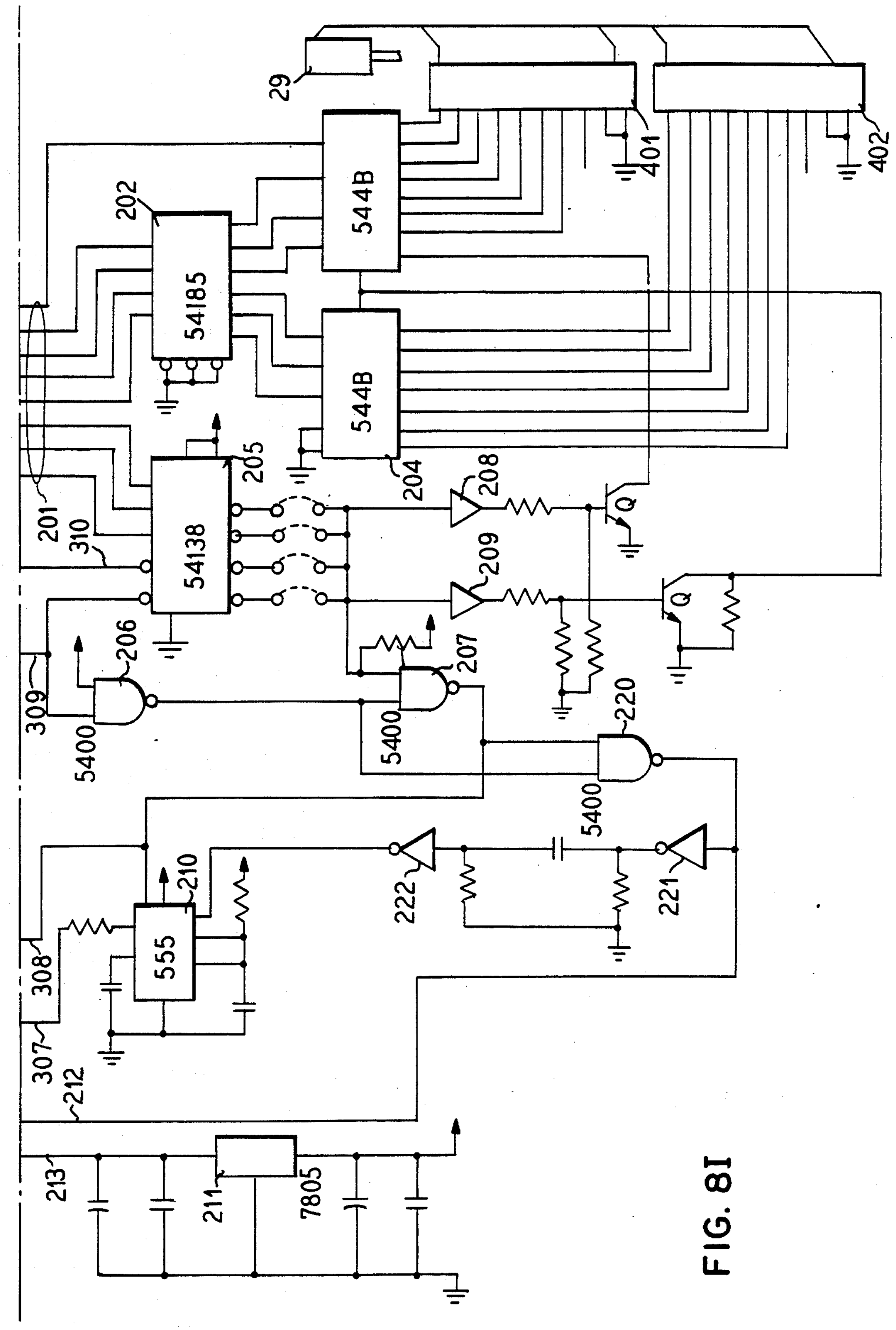

FIGS. 8H and 8I illustrate how the automobile guidance sign 29 at the waiting lane of vehicles are controlled. The output terminal 132 from FIG. 8E is connected to input terminals 132 and 132A which are connected through a plurality of gates 301 through 306 to an output terminal 160. Circuits identical to those illustrated in FIGS. 8H and 8I may be connected to the system to control additional signs as desired without changing the central microprocessing circuitry. A vehicle detector 43*a* is connected through a gate 167 which might be a type 4011 to a type 4035B designated by numeral 166 and which is connected by gates 301 and 302 which may be type 4050s and gate 303 to terminal 132. The detector 43*a* might be, for example, a six foot magnetic loop detector for detecting the presence of vehicles. A pair of diodes are connected from terminal 132*a* to lead 213 and a lead 212 is connected to terminal 132*a*. A triac which might be a type C1068 is connected to terminal 132*a*. Gates 304 and 300 are connected to terminal 132 and gate 300 is connected through gates 161 and 162 which might be type 4011s to gates 163 and 164 which may be type 4049 to a type 54164 designated by numeral 165. The output of element 165 is connected by cable 201 to a 544B, 203 and to a 54185, 202 and to a 54138, 205. The output of element 203 is connected to a least significant digit output terminal 401 which is connected to the automobile control sign 29. The element 204 is connected to the most significant digit terminal 402 which is connected to the sign 29. A type 54138, 205 is connected through strap connectors to a pair of gates 208 and 209 which may be type 4050s which are respectively connected to transistors which may be type 2N4401. A gate 206 which may be type 5400 is connected to lead 309 and to a gate 207 which may be a type 5400 which supplies outputs to a gate 220 which may be a type 5400. A gate 221 is connected to a gate 222 with gates 221 and 222 being type 4049s and gate 222 is connected to a type 555 designated by numeral 210 which is connected to leads 307 and 308, from FIG. 8H.

Leads 212 and 213 from FIG. 8H are connected to gate 221 and to a type 7805, 211 as illustrated.

In operation, when the system is energized the auto guiding signs 29 and 31 for the line of vehicles 16 and 17 direct the vehicles in the order which they have arrived to the teller lanes 11 through 15 on either a call sign from individual tellers or in an automatic mode automatically. The detectors detect the presence of the cars, 43*a* for example, for one of the lanes 16 or 17 supplies input to the computer which calls the cars up in the order which they have arrived. For example, the sign 29 through the microprocessor signals the sign 29 to direct the waiting customer to the first available teller station. If all teller stations have customers present it will read "Stop, Wait Here". When a station becomes available the sign will instruct the waiting customer to "Drive to Teller Number—". It will also sound a buzzer to alert the customer that the message is changing.

The tellers can also control the drive-in traffic at all times. Waiting customers are signalled to drive to the teller station when the teller presses the "call" button on the teller control unit. If two or more "calls" are placed at the same time, the microprocessor stores them in order of placement. When a transaction is near completion, the teller can "call" another customer to keep traffic moving without delay. To close the station the teller merely presses a button on the teller control unit.

With systems having a plurality of approach lanes such as 16 and 17 illustrated in FIG. 1 a dispatching sign is placed at the head of each waiting lane and the car that has been waiting the longest at the head of the one of the lanes is directed to the first available teller station. To prevent confusion and accident hazzards, the invention, automatically directs only one car at a time to proceed to an available teller station.

The printer 33 can print out a record for management information such as follows:

TELLER DATA

TIME: ______ DATE: ______

| LOC. | TIME OPEN | TIME WITH CUST. | # OF CUST. | AVG. TIME/ CUST. | % TIME BUSY |
|---|---|---|---|---|---|
| #1 | 60 | 42 | 31 | 1.35 | 69.9% |
| #2 | 59 | 39 | 26 | 1.50 | 66.0% |
| #3 | 60 | 44 | 32 | 1.37 | 73.3% |
| #4 | 60 | 43 | 37 | 1.16 | 71.6% |
| #5 | 59 | 39 | 28 | 1.39 | 66.0% |
| #6 | 54 | 37 | 16 | 2.31 | 68.5% |

TOTAL NUMBER OF CUSTOMERS: 170
AVERAGE TIME WITH CUSTOMERS: 1.43 MIN.
TOTAL % TIME BUSY: 69.31% so that a continuous monitoring of the activity at the bank and the various teller stations is provided. This provides, for example, the number of customers served, the average time spent per customer, the percentage of time busy with customers and the printer information assist in arranging teller staffing to meet customer traffic patterns, monitoring and supervising teller activity and evaluating individual teller efficiency. The supervisors desk panel control unit 32 illuminates lane numbers of each open teller station and displays which stations have a customer and indicates when customers are at the dispatching sign and combines both visual and audible paging for quick responses to tellers needing assistance.

Attached is the program for the computer.

AUTOGUIDE SOFTWARE OVERVIEW

Autoguide software is a sequencer type software design which directs the flow of software to all of the submodules. Each submodule performs a specific task, but may perform multiple tasks pertaining to the one specific task. The software contains full floating point match subroutines which are called by various submodules.

There are two levels of interrupts; a 1 sec. interrupt for time keeping and the 2nd level interrupt for keyboard entry of printer functions. When an interrupt is generated, vectoring is done through the IRQ vector to "INT". Testing is first done to see if Port 2 was the calling interrupt. If it is not, control is returned to the program. If any keystroke is determined to be the cause of the interrupt, a flag in ram is set and control is returned to the main program. If no keyboard closure was detected it is assumed to be the 1 sec. clock and a flag is set.

The sequencer consists of nine calls to submodules. It is constructed for ease of adding additional routines. They are as follows:

SHET Shifts in teller data and double checks for correct information. Data is stored in ram as 1 byte (8 bits) per teller. Each individual bit pertains to an individual switch of function.

PROT Process teller data. Examines each bit of teller information and stores data in a different section of ram. Software FIFO for tellers is in this section. Customer counting is also done here.

TOUT Output data to Supervisors panel and "call" bit back to Tellers panel.

SHIS Shift in sign data. Data is stored in ram as to whether a car is present or not PROS Process sign data. See whether a car is present or not. Sign FIFO is done here.

STACHK Stack check. This routine checks for any cancelled calls and reorganizes FIFO's.

SOUT Sign output. Checks to see if sign is outputting, and changes messages if necessary.

TIMU Time update. Checks 1 sec. timer flag and updates timers if necessary.

PRCHK Printer check. Checks printer flags and output 1 line to printer. As each teller data is to be printed, it is calculated at this time using math routines.

Although the invention has been described with respect to a drive-in teller control it could also be used in other application such as system for directing to tellers inside the bank lobby, other application in the Post Office, airline terminals, or wherever customers are qued into a single file line.

Although the invention has been described with respect to preferred embodiments, it is not to be so limited as changes and modifications can be made which are within the full intended scope of the invention as defined by the appended claims.

```
==0000                *=00
              --------------------
              AUTOGUIDE SOFTWARE

              --------------------
                RAM  ALLOCATIONS

              --------------------

                                        ;

              ;****** RAM0 *******

==0000 TTEMP          *=*+25            ;TELLER TEMPORARY FILE
==0019 TPERM          *=*+25            ;TELLER PERMANENT FILE
==0032 SPERM          *=*+5             ;SIGN PERMANENT
==0037 STEMP          *=*+1             ;SIGN TEMPORARY
==0038 TIMER          *=*+1             ;TIMER INTERUPT FLAG
==0039 PRINT          *=*+1             ;PRINTEING FLAG
==003A PTL            *=*+1             ;PRINT ADDR LOW
==003B PTH            *=*+1             ;PRINT ADDR HIGH
==003C PTN            *=*+1             ;# OF PRINT LINES
==003D ALPR           *=*+1             ;ALL PRINT FLAG
==003E ALCR           *=*+1             ;ALL CLEAR FLAG
==003F LINE           *=*+1             ;LINE FEED FLAG
==0040 SCPAD          *=*+3             ;SCRATCH PAD
==0043 DEST           *=*+2             ;MATH DESTINATION
==0045 SOUR           *=*+2             ;MATH SOURCE
==0047 SIGN           *=*+1
==0048 X2             *=*+1
==0049 M2             *=*+3             ;MANTISA 2
==004C X1             *=*+1
==004D M1             *=*+3             ;MANTISA 1
==0050 E              *=*+4
==0054 OVFLOW         *=*+1             ;MATH OVERFLOW FLAG
==0055 TNO            *=*+1             ;TELLER NEXT OUT
==0056 TNI            *=*+1             ;TELLER NEXT IN
==0057 SNO            *=*+1             ;SIGN NEXT OUT
==0058 SNI            *=*+1             ;SIGN NEXT IN
==0059 TCF            *=*+1             ;TELLER CALL FLAG
==005A CWF            *=*+1             ;CAR WAITING FLAG
==005B TIMC           *=*+1             ;TIMER C - DISPLAY TIME
==005C TIMD           *=*+1             ;TIMER D - BETWEEN DISPLAYS
==005D TIME           *=*+1             ;TIMER E
==005E SID            *=*+1             ;SIGN DISPLAYING
==005F SIOUT          *=*+1             ;SIGN OUTPUT
==0060 PRIT4          *=*+1             ;PRINT FLAG 4
==0061 PRIT5          *=*+1             ;PRINT FLAG 5
              ;TOTAL CUSTOMER COUNT
==0062 CCH            *=*+1             ;CUST CT. HIGH
==0063 CCM            *=*+1             ;CUST CT. MID.
==0064 CCL            *=*+1             ;CUST CT. LOW
              ;TOTAL TELLER TIME OPEN
==0065 TOH            *=*+1             ;TIME OPEN HIGH
==0066 TOM            *=*+1
==0067 TOL            *=*+1             ;TIME OPEN LOW
              ;TOTAL TIME W/CUSTOMERS
==0068 TBH            *=*+1             ;TIME W/CUST HIGH
==0069 TBM            *=*+1
==006A TBL            *=*+1             ;TIME W/CUST LOW
==006B TEMPO          *=*+3             ;TEMPORARY TIME OPEN
==006E TEMPB          *=*+3             ;TEMP TIME BUSY
==0071 TEMPC          *=*+3             ;TEMP CUST CT.
==0074 UPBCDD         *=*+6             ;UNPACKED BCD DECIMAL
==007A UPBCD          *=*+6             ;UNPACKED BCD
==0080 PAGE           *=*+1             ;PAGE OUTPUT FLAG
==0081 NOPR           *=*+1             ;HAVE NOT PRINTED YET FLAG
==0082 TFI            *=*+100           ;TELLER FIFO
==00E6 SFI            *=*+26            ;SIGN FIFO
```

```
==0100              ;
                    ;****** PAGE 2 *****
==0100                     *=$200
==0200 MESS                *=*+200         ;PRINT MESSAGE BUFFER
==02C8                     *=$02FE
==02FE RWARM               *=*+2           ;COLD OR WARM RESET VARIABLES
                                           ;
                    ;****** PAGE 3 ******
==0300                     *=$300
==0300 TIMA                *=*+26          ;TIME CAR LEFT SIGN
==031A TIMB                *=*+26          ;TIME CAR LEFT STATION
==0334 CCTL                *=*+26          ;CUST CT. LOW
==034E CCTM                *=*+26          ;CUST CT. HIGH
==0368 TTOL                *=*+26          ;TELLER TIME OPEN LSB
==0382 TTOM                *=*+26          ;TELLER TIME OPEN MSB
==039C TTBL                *=*+26          ;TELLER TIME BUSY LSB
==03B6 TTBM                *=*+26          ;TELLER TIME BUSY MSB
==03D0                     .FILE INIT
                    --------------------
                    EQUATES & INITIALIZE

                    --------------------

==03D0                     *=$1800
==1800              ;
                    ;****** VIA'S ******
==1800 VIA1                *=*
==1800 ORB1                *=*+1           ;OUTPUT REGISTER B
==1801 ORA1                *=*+1           ;OUTPUT REGISTER
==1802 DDRB1               *=*+1           ;DATA DIRECTION REG. B
==1803 DDRA1               *=*+1           ;DATA DIRECTION REG. A
==1804 T1L1                *=*+1           ;TIMER 1 LOW
==1805 T1H1                *=*+1           ;T1 TIMER HIGH
==1806 T1LL1               *=*+1           ;T1 TIMER LATCH LOW
==1807 T1HL1               *=*+1           ;T1 TIMER LATCH HIGH
==1808 T2L1                *=*+1           ;T2 TIMER LOW
==1809 T2H1                *=*+1           ;T2 TIMER HIGH
==180A SR1                 *=*+1           ;SHIFT REGISTER
==180B ACR1                *=*+1           ;AUX. CONTROL REGISTER
==180C PCR1                *=*+1           ;PERIPHERAL CONTROL REG.
==180D IFR1                *=*+1           ;INTERUPT FLAG REG.
==180E IER1                *=*+1           ;INTERUPT ENABLE REG.
==180F ORAA1               *=*+1           ;A OUT (NO EFFECT ON HANDSHAKE)

==1810                     *=$1900
==1900 VIA2                *=*
==1900 ORB2                *=*+1
==1901 ORA2                *=*+1
==1902 DDRB2               *=*+1
==1903 DDRA2               *=*+1
==1904 T1L2                *=*+1
==1905 T1H2                *=*+1
==1906 T1LL2               *=*+1
==1907 T1HL2               *=*+1
==1908 T2L2                *=*+1
==1909 T2H2                *=*+1
==190A SR2                 *=*+1
==190B ACR2                *=*+1
==190C PCR2                *=*+1
==190D IFR2                *=*+1
==190E IER2                *=*+1
==190F ORAA2               *=*+1
==1910                     *=$1A00
==1A00 VIA3                *=*
==1A00 ORB3                *=*+1
==1A01 ORA3                *=*+1
==1A02 DDRB3               *=*+1
```

```
==1A03 DDRA3              *=*+1
==1A04 T1L3               *=*+1
==1A05 T1H3               *=*+1
==1A06 T1LL3              *=*+1
==1A07 T1HL3              *=*+1
==1A08 T2L3               *=*+1
==1A09 T2H3               *=*+1
==1A0A SR3                *=*+1
==1A0B ACR3               *=*+1
==1A0C PCR3               *=*+1
==1A0D IFR3               *=*+1
==1A0E IER3               *=*+1
==1A0F ORAA3              *=*+1

==1A10                    *=$1B00
==1B00 STIMA              *=*+1                ;CAR LEFT SIGN
==1B01 STIMB              *=*+1                ;CAR LEFT WINDOW
==1B02 STIMC              *=*+1                ;SIGN DISPLAY TIME
==1B03 STIMD              *=*+1                ;TIME BETWEEN DISPLAYS
==1B04 STIME              *=*+1
==1B05 STIMF              *=*+1
==1B06 STIMG              *=*+1
==1B07 STIMH              *=*+1                ;STACKUM SWITCH

==1B08                    *=$6000
==6000             ;
                   ;** INITIALIZATION *
                   ;
                   ;VIA INIT TABLES
                   ;VIA1 DATA
==6000 TAB1D       03     .BYTE 0              ;ALL LOW
                   00     .BYTE 0              ;ALL LOW
                   C0     .BYTE $C0            ;6&7 OUTPUTS
                   FF     .BYTE $FF            ;ALL OUT
                   04     .BYTE 4              ;SHIFT IN BY T2
                   08     .BYTE 8
                   00     .BYTE 0              ;T2 =08
==6007 TABE1D      7F     .BYTE $7F            ;CLEAR INTERUPT
                   ;VIA1 ADDRESSES
==6008 TAB1A       00     .BYTE <ORB1
                   01     .BYTE <ORA1
                   02     .BYTE <DDRB1
                   03     .BYTE <DDRA1
                   0B     .BYTE <ACR1
                   08     .BYTE <T2L1
                   09     .BYTE <T2H1
                   0E     .BYTE <IER1          ;
                   ;VIA2 DATA
==6010 TAB2D       82     .BYTE $82            ;INT. ON CA1 L TO H
                   00     .BYTE 0              ;B7 LOW
                   80     .BYTE $80            ;B7 OUT
                   00     .BYTE 0              ;ALL IN
                   01     .BYTE 1              ;L TO H -CA1- INTERUPT
                   05     .BYTE 5              ;SHIFT IN BY T2 & LATCH ON CA1
                   08     .BYTE 8
                   00     .BYTE 0              ;T2 = 08
==6018 TABE2D      7F     .BYTE $7F            ;CLEAR INTERUPT
                   ;VIA2 ADDR'S
==6019 TAB2A       0E     .BYTE <IER2
                   00     .BYTE <ORB2
                   02     .BYTE <DDRB2
                   03     .BYTE <DDRA2
                   0C     .BYTE <PCR2
                   0B     .BYTE <ACR2
                   08     .BYTE <T2L2
                   09     .BYTE <T2H2
```

```
             0E     .BYTE <IER2        ;
             ;VIA3 DATA
==6022 TAB3D FF     .BYTE $FF          ;TURN OFF SIGN
             00     .BYTE 0            ;ALL LOW
             80     .BYTE $80          ;PB7 OUT
             7F     .BYTE $7F          ;PA7 IN (BUSY)
             08     .BYTE 8            ;HANDSHAKE OUT
             14     .BYTE $14          ;SHIFT OUT BY T2
             08     .BYTE 8
             00     .BYTE 0            ;T2=08
==602A TABE3D 7F    .BYTE $7F          ;CLEAR INTERUPT
             ;VIA3 ADDR'S
==602B TAB3A 00     .BYTE <ORB3
             01     .BYTE <ORA3
             02     .BYTE <DDRB3
             03     .BYTE <DDRA3
             0C     .BYTE <PCR3
             0B     .BYTE <ACR3
             08     .BYTE <T2L3
             09     .BYTE <T2H3
             0E     .BYTE <IER3        ;
             ;POWER ON RESET COMES HERE
==6034 POR                             ;
==6034 INIT  D8     CLD                ;CLEAR DECIMAL MODE
             78     SEI                ;DISABLE INTERUPTS
             A2FF   LDX #$FF
             9A     TXS                ;INITIALIZE STACK
             A207   LDX #TABE1D-TAB1D        ;GET # OF DATA IN TABLE
==603B INIT1 BD0060 LDA TAB1D,X        ;GET DATA
             BC0860 LDY TAB1A,X        ;GET ADDRESS
             990018 STA VIA1,Y         ;STORE DATA
             CA     DEX
             10F4   BPL INIT1          ;LOOP
             A208   LDX #TABE2D-TAB2D        ;GET # OF DATA
==6049 INIT2 BD1060 LDA TAB2D,X
             BC1960 LDY TAB2A,X
             990019 STA VIA2,Y
             CA     DEX
             10F4   BPL INIT2          ;INIT. VIA2
             A208   LDX #TABE3D-TAB3D
==6057 INIT3 BD2260 LDA TAB3D,X
             BC2B60 LDY TAB3A,X
             99001A STA VIA3,Y
             CA     DEX
             10F4   BPL INIT3          ;INIT. VIA3
             A900.  LDA #00
             855D   STA TIME
==6067       853D   STA ALPR
             853E   STA ALCR
             853F   STA LINE
             8539   STA PRINT
             EA     NOP
             EA     NOP
             EA     NOP
==6072 IN4   ADFE02 LDA RWARM          ;GET RAM PRESET
             CD7775 CMP WARM           ;CMP WITH ROM VALUE
             D00C   BNE CD             ;NOT EQUAL- COLD RESET
             ADFF02 LDA RWARM+1        ;1ST VALUE OK
             CD7875 CMP WARM+1
             D004   BNE CD             ;2ND VALUE NOT EQUAL
==6082       58     CLI                ;WARM RESET, ALLOW INTERUPTS
             4C1075 JMP SEQ            ;GO TO MAIN LOOP
             ;IF COLD RESET, COME HERE
==6086 CD    A900   LDA #00
             A2FF   LDX #$FF
==608A CD1   9500   STA 00,X
             CA     DEX
             D0FB   BNE CD1            ;CLEAR ZERO PAGE RAM
```

```
                  A2FF    LDX #$FF
==6091 COLD2      9D0002 STA $0200,X
                  CA      DEX
                  D0FA    BNE COLD2         ;CLEAR PAGE 2 RAM
                  A2FF    LDX #$FF
==6099 COLD3      9D0003 STA $0300,X
                  CA      DEX
                  D0FA    BNE COLD3         ;CLEAR PAGE 3 RAM
                  A964    LDA #100
                  8555    STA TNO
                  8556    STA TNI           ;SET TELLER NEXT IN & OUT POINTE
                  A919    LDA #25
                  8558    STA SNI
==60A9            8557    STA SNO           ;SET SIGN NEXT IN & OUT POINTERS
                  EA      NOP
                  EA      NOP
                  EA      NOP
                  AD7775 LDA WARM
                  8DFE02 STA RWARM
                  AD7875 LDA WARM+1
                  8DFF02 STA RWARM+1        ;STORE WARM RESET CHECKS
==60BA            58      CLI               ;ALLOW INTERUPTS
                  4C1075 JMP SEQ            ;GO TO MAIN LOOP
                          .FILE ALPR        ;
                  ;****** ALPR *******
                  ;
                  ;PRINT TELLER DATA
==60BE ALPR1      A539    LDA PRINT         ;1ST TIME THRU?
                  F012    BEQ ALPR1A        ;YES
                  C901    CMP #01           ;IN HEADER?
                  F01E    BEQ ALPR2         ;YES
                  C903    CMP #03           ;IN DATA?
                  F041    BEQ ALPR5         ;YES
                  C907    CMP #07           ;IN TOTALS?
                  F003    BEQ JUP1          ;YES
==60CE            4C8665 JMP ALP16          ;DEFAULT TO TRAILER
==60D1 JUP1       4C9A63 JMP ALP13          ;JUMP TO TOTALS
                  ;INIT FOR 1ST TIME THRU ALL PRINT
==60D4 ALPR1A     A901    LDA #01
                  8539    STA PRINT         ;01=HEADER
                  A90A    LDA #$0A          ;10 LINES OF PRINT
                  853C    STA PTN           ;STORE IT
                  A9B1    LDA #<HEAD        ;GET LSB ADDR
                  853A    STA PTL
                  A975    LDA #>HEAD        ;MSB ADDR
                  853B    STA PTH           ;STORE IT
==60E4            ;PRINT HEADER
==60E4 ALPR2      A53C    LDA PTN           ;GET LINE CT
                  F00C    BEQ ALPR4         ;=0,INIT FOR DATA
                  203C70 JSR OUTAL          ;GO OUTPUT 1 LINE
                  C63C    DEC PTN           ;DEC'MT LINE CT
                  E63A    INC PTL           ;INC'NT LINE POINTER
                  D002    BNE ALPR3         ;NO WRAPAROUND
                  E63B    INC PTH
==60F3 ALPR3      60      RTS               ;
                  ;INIT FOR DATA PRINTOUT
==60F4 ALPR4      A901    LDA #01           ;START OF TELLERS
                  853C    STA PTN
                  A903    LDA #03
                  8539    STA PRINT         ;=3 FOR DATA
                  A9CC    LDA #<DATA
                  853A    STA PTL           ;STORE START OF DATA MESS
                  A976    LDA #>DATA
                  853B    STA PTH           ;STORE POINTERS
==6104            207170 JSR TRANM          ;TRANSFER TO RAM
                  20A770 JSR CLTOT          ;CLEAR TOTALS
```

```
                60      RTS                 ;
                ;PRINT DATA
==610B ALPR5    A53C    LDA PTN             ;GET LINE CT.
                C919    CMP #25             ;DO 24 TELLERS YET?
                D014    BNE ALPR5A          ;NO,CHECK NEXT TELLER
                ;INIT FOR TOTALS
                A9FF    LDA #<UNDER         ;UNDERLINE DATA
                853A    STA PTL
                A975    LDA #>UNDER
                853B    STA PTH
                203C70  JSR OUTAL
==611C          A902    LDA #02
                853C    STA PTN             ;TOTAL HAS 3 LINES
                A907    LDA #07
                8539    STA PRINT           ;07=IN TOTALS
                60      RTS                 ;
                ;SEE IF TELLER WAS OPEN
==6125 ALPR5A   208970  JSR CLTEM
                A63C    LDX PTN             ;GET INDEX FROM LINE #
                BD8203  LDA TTOM,X          ;OPEN TIME MSB
                D008    BNE ALPR6           ;DATA, GO CONVERT
                BD6803  LDA TTOL,X          ;ANY DATA IN LSB
                D003    BNE ALPR6           ;DATA, GO CONVERT
                4C8C63  JMP ALP11A          ;NO DATA, EXIT
==6137          ;GET TOTAL TIME OPEN & STORE IN MESS
==6137 ALPR6    BD6803  LDA TTOL,X          ;GET LSB
                854F    STA M1+2
                BD8203  LDA TTOM,X          ;GET MSB
                854E    STA M1+1
                A900    LDA #00
                854D    STA M1
                20DD66  JSR DIV60           ;DIVIDE BY 60
==6148          18      CLC
                A54B    LDA M2+2            ;GET QUOT.LSB
                856D    STA TEMPO+2
                6567    ADC TOL             ;ADD FOR TOTALS
                8567    STA TOL
                A54A    LDA M2+1            ;MSB
                856C    STA TEMPO+1
                6566    ADC TOM             ;ADD FOR TOTAL
                8566    STA TOM
==6159          9002    BCC ALPR6C
                E665    INC TOH             ;TOTAL MSB
==615D ALPR6C   A900    LDA #00
                8549    STA M2              ;CLEAR
                20B466  JSR BCD             ;CONVERT TO PACKED BCD
                A97A    LDA #<UPBCD
                8543    STA DEST
                A900    LDA #00
                8544    STA DEST+1
                20E370  JSR UNPKD           ;UNPACK AND STORE
==616F          A001    LDY #01
                A905    LDA #05
                8542    STA SCPAD+2         ;OUTPUT 5 #
                A902    LDA #>MESS
                8541    STA SCPAD+1         ;STORE MSA
                A905    LDA #<MESS+5
                8540    STA SCPAD           ;STORE LSA
```

```
                 20B170 JSR BLZE          ;BLANK LEADING ZERO &
==6180           209D70 JSR CLM2          ;PLACE IN DATA LINE
                 ;STORE TELLER #
==6183 ALPR6A    A53C   LDA PTN           ;GET TELLER #
                 18     CLC
                 6D7975 ADC OFFSET        ;ADD TELLER OFFSET
                 854B   STA M2+2          ;STORE FOR BCD
                 20B466 JSR BCD
                 A97A   LDA #<UPBCD
                 8543   STA DEST
                 A900   LDA #00
==6194           8544   STA DEST+1        ;SET POINTERS
                 20E370 JSR UNPKD         ;UNPACK AND STORE
                 A57E   LDA UPBCD+4       ;GET 10'S
                 0930   ORA #$30          ;ASCII
                 C930   CMP #$30
                 D002   BNE ALPR6B        ;10'S NOT A 0
                 A920   LDA #$20          ;SPACE CHAR.
==61A3 ALPR6B    8D0102 STA MESS+1        ;STORE 10'S
                 A57F   LDA UPBCD+5       ;GET 1'S
                 0930   ORA #$30
                 8D0202 STA MESS+2        ;STORE
                 ;GET TIME W/CUST.
==61AD ALPR7     209370 JSR CLM1
                 A63C   LDX PTN           ;GET TELLER #
                 BD9C03 LDA TTBL,X        ;GET LSB BUSY
                 854F   STA M1+2          ;MSB BUSY
                 BDB603 LDA TTBM,X        ;GET MSB BUSY
                 854E   STA M1+1          ;STORE
                 20DD66 JSR DIV60         ;DIVIDE BY 60
==61BF           A54B   LDA M2+2          ;LSB QUOTENT
                 8570   STA TEMPB+2
                 18     CLC
                 656A   ADC TBL           ;STORE FOR TOTAL TIME BUSY
                 856A   STA TBL
                 A54A   LDA M2+1
                 856F   STA TEMPB+1
                 6569   ADC TBM
                 8569   STA TBM
==61D0           9002   BCC ALPR7A        ;NO CARRY
                 E668   INC TBH           ;ADD 1 TO MSB
==61D4 ALPR7A    20B466 JSR BCD           ;CONVERT
                 A97A   LDA #<UPBCD
                 8543   STA DEST
                 A900   LDA #00
                 8544   STA DEST+1        ;POINTERS
                 20E370 JSR UNPKD         ;UNPACK
                 A001   LDY #01           ;UPBCD START
==61E4           A905   LDA #05           ;# OF CHAR.
                 8542   STA SCPAD+2
                 A902   LDA #>MESS
                 8541   STA SCPAD+1       ;MSA
                 A90C   LDA #<MESS+12
                 8540   STA SCPAD         ;LSA
                 20B170 JSR BLZE          ;BLANK ZERO'S AND STORE IN MESS
                 ;# OF CUSTOMERS
==61F3 ALPR8     209D70 JSR CLM2
                 A63C   LDX PTN           ;TELLER #
                 BD3403 LDA CCTL,X        ;LSB CT.
                 18     CLC
                 854B   STA M2+2
                 8573   STA TEMPC+2
                 6564   ADC CCL           ;TOTAL CT.
                 8564   STA CCL
==6204           BD4E03 LDA CCTM,X        ;MSB CT.
                 854A   STA M2+1
```

```
                 8572   STA TEMPC+1
                 6563   ADC CCM          ;TOTAL CT.
                 8563   STA CCM
                 9002   BCC ALPR8A
                 E662   INC CCH          ;MSB TOTAL
==6213 ALPR8A    20B466 JSR BCD          ;CONVERT
                 A97A   LDA #<UPBCD
                 8543   STA DEST
                 A900   LDA #00
                 8544   STA DEST+1       ;POINTERS
                 20E370 JSR UNPKD        ;UNPACK
                 A001   LDY #01
==6223           A905   LDA #05          ;# OF NUMBERS
                 8542   STA SCPAD+2
                 A902   LDA #>MESS
                 8541   STA SCPAD+1      ;MSA
                 A913   LDA #<MESS+19
                 8540   STA SCPAD        ;LSA
                 20B170 JSR BLZE         ;BLANK ZERO'S AND STORE IN MESS
                        .FILE ALPR9      ;
                 ;AVERAGE TIME/CUST. (TIME BUSY/# OF CUST)
==6232 ALPR9     209370 JSR CLM1
                 209D70 JSR CLM2         ;CLEAR MATH AREAS
                 A56E   LDA TEMPB        ;MSB BUSY
                 854D   STA M1
                 A56F   LDA TEMPB+1
                 854E   STA M1+1
                 A570   LDA TEMPB+2
==6242           854F   STA M1+2         ;LSB BUSY
                 206D66 JSR FLOAT
                 A24C   LDX #<X1
                 A048   LDY #<X2
                 205C70 JSR TRANB        ;M1 TO M2
                 A571   LDA TEMPC
                 854D   STA M1           ;MSB CUST. COUNT
==6252           A572   LDA TEMPC+1
                 854E   STA M1+1
                 A573   LDA TEMPC+2
                 854F   STA M1+2         ;LSB CUST. CT.
                 206D66 JSR FLOAT
                 A54C   LDA X1
                 D003   BNE AL9
                 4CF462 JMP ZERO         ;ZERO EXP
==6264 AL9       201E66 JSR FDIV         ;DIVIDE
                 A554   LDA OVFLOW       ;GET FLAG
                 D06E   BNE OVER         ;IF SET BR.
                 20FB70 JSR FIX1         ;UNFLOAT RESULT - E+2 USED
                 A24D   LDX #<M1
                 A049   LDY #<M2
                 A902   LDA #02
==6274           205E70 JSR TRANB1       ;M1 TO M2
                 20B466 JSR BCD          ;CONVERT RESULT
                 A97A   LDA #<UPBCD
                 8543   STA DEST
                 A900   LDA #00
                 8544   STA DEST+1       ;POINTERS
                 20E370 JSR UNPKD        ;UNPACK & SAVE
==6285           209370 JSR CLM1
                 201371 JSR FIX2         ;FIX DECIMAL PORTION
                 209D70 JSR CLM2
                 A24D   LDX #<M1
                 A049   LDY #<M2
                 A902   LDA #02
                 205E70 JSR TRANB1       ;M1 TO M2
==6297           20B466 JSR BCD
                 A974   LDA #<UPBCDD     ;UNPACK AND STORE DECIMAL
                 8543   STA DEST
                 A900   LDA #00
```

```
                8544    STA DEST+1
                20E370  JSR UNPKD
                A001    LDY #01          ;
==62A7          ;CHECK FOR TOO BIG A NUMBER
                A200    LDX #00
==62A9 ALPR9A   B57A    LDA UPBCD,X
                D02C    BNE OVER         ;TOO BIG
                E8      INX
                E004    CPX #04
                D0F7    BNE ALPR9A       ;LOOP
==62B2 ALPR9B   B57A    LDA UPBCD,X      ;GET DATA
                F005    BEQ ALPR9C       ;#=0
                0930    ORA #$30         ;ASCII
                991A02  STA MESS+26,Y
==62BB ALPR9C   C8      INY
                E8      INX
                E005    CPX #05
                D0F1    BNE ALPR9B       ;LOOP
                B57A    LDA UPBCD,X
                0930    ORA #$30
                991A02  STA MESS+26,Y
                A575    LDA UPBCDD+1     ;DECIMAL
                0930    ORA #$30
==62CC          8D1E02  STA MESS+30
                A576    LDA UPBCDD+2
                0930    ORA #$30
                8D1F02  STA MESS+31
                4CFF62  JMP ALP10        ;GO TO WORK LOAD
                ;PRINTS "OVFL" IF OVERFLOW
==62D9 OVER     A94F    LDA #'O'
                8D1C02  STA MESS+28
                A956    LDA #'V'
                8D1D02  STA MESS+29
                A946    LDA #'F'
                8D1E02  STA MESS+30
                A94C    LDA #'L'
==62EA          8D1F02  STA MESS+31
                A900    LDA #00
                8554    STA OVFLOW       ;RESET
                4CFF62  JMP ALP10        ;GO TO WORK LOAD
                ;STORES ZEROS IN AVERAGE
==62F4 ZERO     A930    LDA #$30
                8D1C02  STA MESS+28
                8D1E02  STA MESS+30
                8D1F02  STA MESS+31      ;
                ;% WORK LOAD ((TIME BUSY/TIME OPEN)X100)
==62FF ALP10    209370  JSR CLM1
                209D70  JSR CLM2
                A56E    LDA TEMPB        ;MSB BUSY
                854D    STA M1
                A56F    LDA TEMPB+1
                854E    STA M1+1
                A570    LDA TEMPB+2
==630F          854F    STA M1+2         ;LSB BUSY
                206D66  JSR FLOAT
                A24C    LDX #<X1
                A048    LDY #<X2
                205C70  JSR TRANB        ;M1 TO M2
                A26B    LDX #<TEMPO
                A04D    LDY #<M1
==631F          A902    LDA #02
                205E70  JSR TRANB1       ;TEMPO TO M1
                206D66  JSR FLOAT
                A54C    LDA X1           ;GET EXP.1
                F03E    BEQ ZERO1        ;0 EXP.= DIV. BY 0
                201E66  JSR FDIV         ;DIVIDE
                20FB70  JSR FIX1         ;UNFLOAT RESULT
==6331          A54F    LDA M1+2
```

```
                     DØ3F   BNE HUND           ;M1+2 NOT =Ø THEN =1ØØ%
                     2Ø1371 JSR FIX2           ;FIX DECIMAL
                     A24D   LDX #<M1
                     AØ49   LDY #<M2
                     A9Ø2   LDA #Ø2
                     2Ø5E7Ø JSR TRANB1         ;M1 TO M2
==6341               2ØB466 JSR BCD            ;CONVERT
                     A974   LDA #<UPBCDD
                     8543   STA DEST
                     A9ØØ   LDA #ØØ
                     8544   STA DEST+1         ;POINTERS
                     2ØE37Ø JSR UNPKD          ;UNPACK & STORE
                     A575   LDA UPBCDD+1
==6351               FØØ5   BEQ ALP1ØA         ;DON'T PRINT IF Ø
                     Ø93Ø   ORA #$3Ø
                     8D22Ø2 STA MESS+34        ;STORE
==6358 ALP1ØA        A576   LDA UPBCDD+2
                     Ø93Ø   ORA #$3Ø
                     8D23Ø2 STA MESS+35        ;STORE IT
                     A577   LDA UPBCDD+3
                     Ø93Ø   ORA #$3Ø
                     8D25Ø2 STA MESS+37        ;STORE TO RT. OF DECIMAL
                     4C8163 JMP ALP11          ;GO PRINT LINE
==6369               ;STORE ZEROS
==6369 ZERO1         A93Ø   LDA #$3Ø
                     8D23Ø2 STA MESS+35
                     8D25Ø2 STA MESS+37
                     4C8163 JMP ALP11          ;STORE 1ØØ%
==6374 HUND          A931   LDA #$31
                     8D23Ø2 STA MESS+35
                     A93Ø   LDA #$3Ø
                     8D24Ø2 STA MESS+36
                     8D25Ø2 STA MESS+37        ;GO PRINT TOTAL LINE
==6381 ALP11         A9ØØ   LDA #<MESS
                     853A   STA PTL
                     A9Ø2   LDA #>MESS
                     853B   STA PTH            ;POINTERS
                     2Ø3C7Ø JSR OUTAL          ;GO PRINT LINE
==638C ALP11A        E63C   INC PTN            ;INC'MT LINE CT.
                     A9CC   LDA #<DATA
                     853A   STA PTL
                     A976   LDA #>DATA
                     853B   STA PTH
                     2Ø717Ø JSR TRANM          ;REPLACE DATA LINE FOR NEXT TIME
                     6Ø     RTS                ;RETURN TO MAIN LOOP
                     ;***** PRINT TOTALS *****
==639A ALP13         A53C   LDA PTN            ;GET LINE CT.
                     DØØ3   BNE AL13A
                     4CAA64 JMP ALP15          ;LAST LINE
==63A1 AL13A         C9Ø1   CMP #Ø1
                     FØ5Ø   BEQ ALP14          ;GO PRINT TIME W/CUST.
                     ;DEFAULT - PRINT TOTAL # OF CUST.
                     AØØ2   LDY #Ø2
                     2Ø2C7Ø JSR CRLF
==63AA ALP13A        A9F5   LDA #<TNUM
                     853A   STA PTL
                     A976   LDA #>TNUM
                     853B   STA PTH            ;STORE POINTERS
                     2Ø717Ø JSR TRANM          ;TRANSFER TO RAM
                     A562   LDA CCH            ;TOTAL CT. MSB
                     1ØØ6   BPL ALP13B         ;IF ANYTHING IN BIT 7 - OVERFLOW
                     2Ø4C65 JSR OVER1
==63BC               4CE763 JMP ALP13C         ;PRINT
==63BF ALP13B        A262   LDX #<CCH          ;TOTAL CT.
                     AØ49   LDY #M2
                     A9Ø2   LDA #Ø2
                     2Ø5E7Ø JSR TRANB1         ;CTS TO M2
                     2ØB466 JSR BCD            ;CONVERT
```

```
                A97A   LDA #<UPBCD
                8543   STA DEST
==63CF          A900   LDA #00
                8544   STA DEST+1
                20E370 JSR UNPKD         ;UNPACK & STORE
                A000   LDY #00
                A905   LDA #05
                8542   STA SCPAD+2       ;# OF CHAR.
                A902   LDA #>MESS
                8541   STA SCPAD+1
==63E0          A91C   LDA #<MESS+28
                8540   STA SCPAD
                20B170 JSR BLZE          ;STORE W/LEAD ZERO BLANK
==63E7 ALP13C   A900   LDA #<MESS
                853A   STA PTL
                A902   LDA #>MESS
                853B   STA PTH
                203C70 JSR OUTAL         ;OUTPUT MESSAGE
                C63C   DEC PTN           ;REDUCE LINE CT.
                60     RTS               ;RETURN TO MAIN LOOP
                       .FILE ALP14       ;
                ;PRINT TOTAL AVE. TIME WITH CUS.
                ;TOTAL TIME BUSY/TOTAL # OF CUST.
==63F5 ALP14    A91B   LDA #<AVT
                853A   STA PTL
                A977   LDA #>AVT
                853B   STA PTH           ;POINTERS
                207170 JSR TRANM         ;STORE IN RAM
                A568   LDA TBH           ;TIME BUSY MSB
                1006   BPL ALP14A        ;IF ANYTHING - OVERFLOW
                204C65 JSR OVER1
==6407          4C9C64 JMP ALP14C
==640A ALP14A   A902   LDA #02
                A268   LDX #<TBH
                A04D   LDY #<M1
                205E70 JSR TRANB1        ;TIME BUSY TO M1
                206D66 JSR FLOAT
                A24C   LDX #<X1
                A048   LDY #<X2
==641A          205C70 JSR TRANB         ;TRANSFER
                A262   LDX #<CCH
                A04D   LDY #<M1
                A902   LDA #02
                205E70 JSR TRANB1        ;CT TO M1]
                206D66 JSR FLOAT
                A54C   LDA X1            ;GET EXPONET 1
==642B          D003   BNE ALP14D        ;0=DIVISION BY 0
                4C5D65 JMP ZERO2
==6430 ALP14D   201E66 JSR FDIV          ;DIVIDE
                20FB70 JSR FIX1          ;UNFLOAT #
                A049   LDY #<M2
                A24D   LDX #<M1
                A902   LDA #02
                205E70 JSR TRANB1        ;M1 TO M2
                20B466 JSR BCD           ;CONVERT
==6442          A97A   LDA #<UPBCD
                8543   STA DEST
                A900   LDA #00
                8544   STA DEST+1
                20E370 JSR UNPKD         ;UNPACK & STORE
                A200   LDX #00
==644F ALP14B   B57A   LDA UPBCD,X
                F006   BEQ AL14B
                204C65 JSR OVER1
                4C9C64 JMP ALP14C
==6459 AL14B    E8     INX
                E004   CPX #04
                D0F1   BNE ALP14B        ;LOOP
```

```
                  A57E   LDA UPBCD+4
                  F005   BEQ A14B          ;=ZERO
                  0930   ORA #$30
                  8D1D02 STA MESS+29
==6467 A14B       A57F   LDA UPBCD+5
                  0930   ORA #$30
                  8D1E02 STA MESS+30       ;STORE EVEN IF 0
                  209370 JSR CLM1
                  209D70 JSR CLM2
                  201371 JSR FIX2          ;FIX DECIMAL
==6477            A24D   LDX #<M1
                  A049   LDY #<M2
                  A902   LDA #02
                  205E70 JSR TRANB1        ;M1 TO M2
                  20B466 JSR BCD
                  A974   LDA #<UPBCDD
                  8543   STA DEST
==6487            A900   LDA #00
                  8544   STA DEST+1
                  20E370 JSR UNPKD         ;UNPACK & STORE
                  A575   LDA UPBCDD+1
                  0930   ORA #$30
                  8D2002 STA MESS+32
                  A576   LDA UPBCDD+2
==6497            0930   ORA #$30
                  8D2102 STA MESS+33       ;STORE DECIMAL
==649C ALP14C     A900   LDA #<MESS
                  853A   STA PTL
                  A902   LDA #>MESS
                  853B   STA PTH           ;POINTERS
                  203C70 JSR OUTAL         ;OUTPUT MESSAGE
                  C63C   DEC PTN
                  60     RTS               ;RETURN TO MAIN LOOP
                  ;PRINT WORK LOAD %
                  ;((TIME BUSY/TIME OPEN)X 100)
==64AA ALP15      A943   LDA #<TWORK
                  853A   STA PTL
                  A977   LDA #>TWORK
                  853B   STA PTH
                  207170 JSR TRANM         ;TRANSFER  MESSAGE TO RAM
                  A965   LDA #TOH          ;OPEN MSB
                  1006   BPL ALP15A
                  204C65 JSR OVER1
==64BC            4C3065 JMP ALP15D
==64BF ALP15A     A902   LDA #02
                  A268   LDX #<TBH         ;BUSY MSB
                  A04D   LDY #<M1
                  205E70 JSR TRANB1        ;BUSY TO M1
                  206D66 JSR FLOAT
                  A24C   LDX #<X1
                  A048   LDY #<X2
==64CF            205C70 JSR TRANB         ;M1 TO M2
                  A902   LDA #02
                  A265   LDX #<TOH         ;OPEN MSB
                  A04D   LDY #<M1
                  205E70 JSR TRANB1        ;OPEN TO M1
                  206D66 JSR FLOAT
                  A54C   LDA X1            ;EXPONENT 1
==64E0            D003   BNE ALP15E        ;0=DIVISION BY 0
                  4C6B65 JMP ZERO3
==64E5 ALP15E     201E66 JSR FDIV          ;DIVIDE
                  20FB70 JSR FIX1          ;UNFLOAT #
                  A54F   LDA M1+2
                  F003   BEQ ALP15B        ;NOT ZERO
                  4C7965 JMP HUND1         ;GO PRINT 100%
==64F2 ALP15B     209370 JSR CLM1
                  201371 JSR FIX2          ;UNFLOAT DECIMAL
                  209D70 JSR CLM2
```

```
                A902    LDA #02
                A24D    LDX #<M1
                A049    LDY #<M2
                205E70 JSR TRANB1          ;M1 TO M2
==6504          20B466 JSR BCD
                A974    LDA #<UPBCDD
                8543    STA DEST
                A900    LDA #00
                8544    STA DEST+1
                20E370 JSR UNPKD           ;UNPACK & STORE
                A575    LDA UPBCDD+1
==6514          F005    BEQ ALP15C         ;SKIP IF ZERO
                0930    ORA #$30
                8D1D02 STA MESS+29         ;STORE
==651B ALP15C   A576    LDA UPBCDD+2
                0930    ORA #$30
                8D1E02 STA MESS+30
                A577    LDA UPBCDD+3
                0930    ORA #$30
                8D2002 STA MESS+32
                A578    LDA UPBCDD+4
==652B          0930    ORA #$30
                8D2102 STA MESS+33
==6530 ALP15D   A900    LDA #<MESS
                853A    STA PTL
                A902    LDA #>MESS
                853B    STA PTH            ;POINTERS
                203C70 JSR OUTAL           ;OUTPUT LINE
                A993    LDA #<TRMESS
                853A    STA PTL
                A977    LDA #>TRMESS
==6541          853B    STA PTH            ;POINTERS FOR TRAILER
                A90F    LDA #$0F
                8539    STA PRINT          ;FOR TRAILER
                A904    LDA #04
                853C    STA PTN            ;# OF LINES
                60      RTS                ;RETURN TO MAIN LOOP
                ;STORE OVERFLOW MESSAGE
==654C OVER1    A000    LDY #00
                A21F    LDX #31
==6550 OVER1A   B96A77 LDA OVERM,Y
                9D0002 STA MESS,X
                E8      INX
                C8      INY
                E026    CPX #38
                D0F4    BNE OVER1A         ;LOOP
                60      RTS                ;
                ;PRINTS ALL ZEROS IF DIVISION IS BY ZERO
==655D ZERO2    A930    LDA #$30
                8D1E02 STA MESS+30
                8D2002 STA MESS+32
                8D2102 STA MESS+33
                4C9C64 JMP ALP14C          ;
==656B ZERO3    A930    LDA #$30
==656D ZERO3A   8D1E02 STA MESS+30
                8D2002 STA MESS+32
                8D2102 STA MESS+33
                4C3065 JMP ALP15D
==6579 HUND1    A931    LDA #'1'
                8D1C02 STA MESS+28
                A930    LDA #'0'
                8D1D02 STA MESS+29
                4C6D65 JMP ZERO3A          ;
                ;**** PRINT TRAILER ****
==6586 ALP16    A53C    LDA PTN            ;GET # OF LINES
                F017    BEQ ALP16B         ;IF ZERO - ALL DONE
                C904    CMP #04            ;IF 4, THIS IS START
                D007    BNE ALP16A
```

```
                A002   LDY #02
                C63C   DEC PTN
                4C2C70 JMP CRLF
==6595 ALP16A   203C70 JSR OUTAL         ;OUTPUT LINE
                C63C   DEC PTN
                E63A   INC PTL
                D002   BNE ALP16C
                E63B   INC PTH
==65A0 ALP16C   60     RTS               ;RETURN TO MAIN LOOP
==65A1 ALP16B   A006   LDY #06           ;LAST TIME
                202C70 JSR CRLF          ;OUTPUT 5 CR'S
                A900   LDA #00
                8539   STA PRINT         ;RESET FLAGS
                853D   STA ALPR
                60     RTS               ;RETURN

                ;*** ALL CLEAR *****
                ;CLEAR ALL PRINTER AND DATA RELATED MEMORY
                ;
==65AD ALCR1    A2FF   LDX #$FF
                A900   LDA #00
==65B1 ALCR1A   9D0003 STA $0300,X
                CA     DEX
                E010   CPX #$10
                D0F8   BNE ALCR1A        ;LOOP
                208970 JSR CLTEM         ;CLEAR TEMPORARY
                20A770 JSR CLTOT         ;CLEARS TOTALS
                A972   LDA #<CLMESS
==65C1          853A   STA PTL
                A977   LDA #>CLMESS
                853B   STA PTH           ;POINTERS
                203C70 JSR OUTAL         ;OUTPUT MESSAGE
                A007   LDY #07
                202C70 JSR CRLF
                A900   LDA #00
==65D1          853E   STA ALCR          ;RESET FLAG
                60     RTS               ;RETURN
                       .FILE FPOIN
                --------------------
                FLOATING POINT

                --------------------
                   ROUTINES

                --------------------

                                         ;
                ;****** ADD ********
                ;
                ;M1 + M2 (STORE IN M1)
==65D4 ADD      18     CLC               ;CLEAR CARRY
                A202   LDX #$2           ;INDEX FOR 3 BYTE ADD
==65D7 ADD1     B54D   LDA M1,X
                7549   ADC M2,X          ;ADD A BYTE OF M2 TO M1
                954D   STA M1,X
                CA     DEX               ;INDEX TO MOST SIG.BYTE
                10F7   BPL ADD1          ;LOOP
                60     RTS               ;
                ;**** SUBTRACT *****
                ;M2-M1=M1
==65E1 FSUB     201066 JSR FCOMPL        ;CMPL M1, CLR CARRY UNLESS 0
==65E4 SWPALG   20A366 JSR ALGNSW        ;RT SHFT M1 OR SWAP WITH
==65E7 FADD     A548   LDA X2
                C54C   CMP X1            ;COMP EXP1 WITH EXP2
                D0F7   BNE SWPALG        ;IF #, SWAP ADDENDS OR ALIGN MAS
                20D465 JSR ADD           ;AD ALIGNED MANTS
==65F0 ADDEND   7003   BVS ENDA1         ;OV:SHIFT M1 RT.,CARRY INTO SIGN
```

```
                4C7F66 JMP NORM         ;NO OVERFLOW - NORMAL RESULT
==65F5 ENDA1    4CA866 JMP RTLOG        ;
                ;**** MUTIPLY ******
                ;M2 X M1 = M1
==65F8 FMUL     204E66 JSR MD1          ;ABSL VAL OF M1 ,M2
                654C   ADC X1           ;ADD EX1 TO EX2 FOR PRDT EXP
                208466 JSR MD2
                18     CLC
==6601 MUL1     20AC66 JSR RTLOG1       ;M1 & E RIGHT
                9003   BCC MUL2         ;BR SKIP PART. PROD
                20D465 JSR ADD          ;ADD MULTIPLICAND TO PRODUCT
==6609 MUL2     88     DEY              ;NEXT MUL.
                10F5   BPL MUL1         ;LOOP
==660C MDEND    4647   LSR SIGN         ;TEST SIGN LSB
==660E NORMX    906F   BCC NORM         ;IF EVEN NORM PROD
==6610 FCOMPL   38     SEC              ;SET CARRY FOR SUB.
                A203   LDX #$3          ;FOR 3 BYTE SUB.
==6613 COMPL1   A900   LDA #00          ;CLR A
                F54C   SBC X1,X         ;SUB BYTE OF EXP1
                954C   STA X1,X         ;RESTORE IT
                CA     DEX              ;NEXT MORE SIGNF BYTE
                D0F7   BNE COMPL1       ;LOOP
                F0D2   BEQ ADDEND       ;NORMAL (OR SHIFT RT IF OVFL)
                ;
                ;***** DIVIDE ******
                ;M2/M1=M1
==661E FDIV     204E66 JSR MD1          ;GET ABS VAL OF M1, M2
                E54C   SBC X1           ;SUB EXP1 FROM EXP2
                208466 JSR MD2          ;SAVE AS QUOT EXP
==6626 DIV1     38     SEC              ;SET CARRY FOR SUB.
                A202   LDX #2           ;INDEX FOR 3 BYTE SUBT
==6629 DIV2     B549   LDA M2,X
                F550   SBC E,X          ;SUB A BYTE OF E FROM MANT2
                48     PHA
                CA     DEX NEXT MORE SIGN. BYTE
                10F8   BPL DIV2         ;LOOP
                A2FD   LDX #$FD         ;INDEX FOR 3 BYTE CONDTIONAL MOE
==6633 DIV3     68     PLA              ;GET DIFFERENCE
                9002   BCC DIV4         ;IF M2<E THEN DON'T RESTORE M2
                954C   STA M2+3,X
==6638 DIV4     E8     INX              ;NEXT LESS SIGNF BYTE
                D0F8   BNE DIV3         ;LOOP
                264F   ROL M1+2
                264E   ROL M1+1         ;ROLL QUOT LEFT ,CARRY TO LSB
                264D   ROL M1
                064B   ASL M2+2
                264A   ROL M2+1         ;SHFT DIVIDEND LEFT
                2649   ROL M2
                B055   BCS OVFL         ;OVFL IS DUE TO UNNORMED DIVISIO
==6649          88     DEY              ;NEXT DIVIDE
                D0DA   BNE DIV1         ;LOOP 23 TIMES
                F0BE   BEQ MDEND        ;NORM QUOT & CORR SIGN
                       .FILE FPSUB
                ---------------------
                FLOATING POINT

                ---------------------
                  SUBROUTINES

                ---------------------

==664E MD1      0647   ASL SIGN         ;CLEAR LSB OF SIGN
                205366 JSR ABSWAP       ;ABS VAL M1, THEN SWAP WITH M2
==6653 ABSWAP   244D   BIT M1           ;MANT1 NEG?
                1005   BPL ABSWA1       ;NO SWAP  WITH M2 & RTN
                201066 JSR FCOMPL       ;YES, COMPLIMENT
                E647   INC SIGN         ;INC SIGN, COMPL LSB
```

```
==665C ABSWA1   38      SEC               ;SET FOR RTN TO MUL/DIV
==665D SWAP     A204    LDX #4            ;INDEX FOR 4-BYTE SWAP
==665F SWAP1    944F    STY E-1,X
                B54B    LDA X1-1,X        ;SWAP BYTE OF EXP/MANT1 WITH
                B447    LDY X2-1,X        ;EXP/MANT2 AND LEAVE A COPY OF
                944B    STY X1-1,X        ;MAN1 IN E (3BYTES). E+3 USED
                9547    STA X2-1,X
                CA      DEX               ;INDEX TO NEXT BYTE
                D0F3    BNE SWAP1         ;LOOP
                60      RTS               ;
==666D FLOAT    A996    LDA #$96          ;INIT EXP1 TO 22
                854C    STA X1            ;THEN NORMAL TO FLOAT
==6671 NORM1    A54D    LDA M1            ;HIGH ORDER MANT1 BYTE
                C9C0    CMP #$C0          ;UPPER TWO BYTES UNEQUAL
                300C    BMI RTS1          ;YES, RTN WITH M1 NORMALIZED
                C64C    DEC X1
                064F    ASL M1+2
                264E    RCL M1+1          ;SHIFT MANT1 (3BYTES)LEFT
                264D    ROL M1
==667F NORM     A54C    LDA X1            ;EXP1 ZERO?
                D0EE    BNE NORM1         ;NO CONT. NORMALIZING
==6683 RTS1     60      RTS               ;
==6684 MD2      864F    STX M1+2          ;MUL/DIV SUBROUTINE 2
                864E    STX M1+1          ;CLR M1 (3BYTES) FOR MUL/DIV
                864D    STX M1
                B010    BCS OVCHK         ;IF CALC. SET CARRY, CHK FOR OVE
                3007    BMI MD3           ;IF NEG., THEN NO UNDERFLOW
                68      PLA               ;POP ONE RETURN LEVEL
                68      PLA
                B003    BCS MD3
                4C0E66 JMP NORMX          ;CLR X1 & RET
==6695 MD3      4980    EOR #$80          ;COMPL SIGN BIT OF EXP
                854C    STA X1            ;STORE IT
                A017    LDY #$17          ;COUNT 24 MUL/ 23 DIV ITERATIONS
                60      RTS               ;
==669C OVCHK    10F7    BPL MD3           ;IF POS. THEN NO OVERFLOW
==669E OVFL     A9FF    LDA #$FF
                8554    STA OVFLOW        ;SET OVERFLOW FLAG
                60      RTS               ;RETURN
==66A3 ALGNSW   90B8    BCC SWAP          ;SWAP IF CARRY CLEAR
                ;ELSE SHIFT RT ARITH
==66A5 RTAR     A54D    LDA M1.           ;SIGN OF MAN1 INTO CARRY FOR
                0A      ASL A             ;RT ARITH SHIFT
==66A8 RTLOG    E64C    INC X1            ;INC X1 TO ADJ. FOR RT SHIFT
                F0F2    BEQ OVFL          ;EXP1 OUT OF RANGE
==66AC RTLOG1   A2FA    LDX #$FA          ;INDEX FOR 6 BYTE RT SHFT BY 1BT
==66AE ROR1     7653    ROR E+3,X
                E8      INX               ;NEXT BYTE OF SHIFT
                D0FB    BNE ROR1          ;LOOP
                60      RTS               ;
                ;
                ;** BCD CONVERT ****
                ;
                ;M2=MSD BINARY  M2+2=LSD BINARY
                ;X1=MSD BCD   M1+2=LSD BCD
==66B4 BCD      A900    LDA #0            ;CLEAR BCD REGS 8 DIGITS
                A203    LDX #03
==66B8 BCDCL    954C    STA X1,X
                CA      DEX
                10FB    BPL BCDCL
                A018    LDY #24           ;# OF BINARY BITS
==66BF BCDX2    18      CLC               ;BCD MULTIPLY BY 2
                F8      SED
                A203    LDX #3            ;# FOR 8 BCD DIGITS
==66C3 BCDX     B54C    LDA X1,X
                754C    ADC X1,X
                954C    STA X1,X
```

```
                 CA      DEX
                 10F7    BPL BCDX
==66CC BINX2     18      CLC              ;BINARY MULTIPLY BY 2
                 D8      CLD
                 A202    LDX #2           ;# FOR 24 BIT BINARY #
==66D0 BINX      3649    ROL M2,X         ;BINARY X2
                 CA      DEX
                 10FB    BPL BINX
                 9002    BCC DBC          ;ADD CARRY TO BCD #
                 E64F    INC M1+2
==66D9 DBC       88      DEY              ;DECR'MT BIT COUNTER
                 D0E3    BNE BCDX2
                 60      RTS              ;
                 ;DIVIDE BY 60
                 ;M1 DIVIDED BY 60
                 ;RESULT (FIXED) IN M2
==66DD DIV60     206D66 JSR FLOAT         ;FLOAT M1
                 A24C    LDX #<X1
                 A048    LDY #<X2
                 205C70 JSR TRANB         ;M1 TO M2
                 A985    LDA #$85
                 854C    STA X1
                 A978    LDA #$78         ;60 FLOATED
==66ED           854D    STA M1
                 A900    LDA #00
                 854E    STA M1+1
                 854F    STA M1+2
                 201E66 JSR FDIV          ;DO IT
                 20FB70 JSR FIX1          ;UNFLOAT
                 A902    LDA #02
==66FD           A24D    LDX #<M1
                 A049    LDY #<M2
                 205E70 JSR TRANB1        ;STORE RESULT IN M2
                 60      RTS              ;
                         .FILE PRCHK
                 ---------------------
                 PRINTER ROUTINES

                 ---------------------
                                          ;
                 ;****** PRCHK ******
==6705                   *=$7000
==7000           ;CHECK IF PRINTER IS BUSY
==7000 PRCHK     A581    LDA NOPR         ;PRINTED YET?
                 F008    BEQ CHK2         ;NO, CHECK BUSY
                 AD0D1A LDA IFR3
                 2902    AND #02          ;ACKNOWLEDGE BACK?
                 D007    BNE PRCHK1       ;YES
                 60      RTS
==700C CHK2      AD0F1A LDA ORAA3         ;BUSY?
                 1001    BPL PRCHK1       ;NOT BUSY
                 60      RTS              ;PRINTER BUSY,RETURN
                 ;CHECK FLAGS
==7012 PRCHK1    A53D    LDA ALPR         ;GET ALL PRINT FLAG
                 F003    BEQ PRCHK2       ;NOT SET
                 4CBE60 JMP ALPR1         ;SET, GO TO ALL PRINT
==7019 PRCHK2    A53E    LDA ALCR         ;GET ALL CLEAR FLAG
                 F003    BEQ PRCHK3       ;NOT SET
                 4CAD65 JMP ALCR1         ;SET, GO TO ALL CLEAR
==7020 PRCHK3    A53F    LDA LINE         ;GET CR/LF FLAG
                 F007    BEQ PRCHK4       ;NOT SET, RET
                 A004    LDY #04
                 202C70 JSR CRLF          ;GO PRINT 2 LINE FEEDS
                 843F    STY LINE         ;RESET FLAG
==702B PRCHK4    60      RTS              ;
                 ;OUTPUT # OF LINEFEEDS IN Y
==702C CRLF      A90D    LDA #$0D         ;ASCII CR
```

```
                  204070 JSR OUT          ;OUTPUT LF
==7031 CRLF1      AD0D1A LDA IFR3         ;GET ACKN.
                  2902   AND #02
                  F0F9   BEQ CRLF1
                  88     DEY
                  D0F1   BNE CRLF         ;LOOP
                  60     RTS              ;
                  ;OUTPUT 1 LINE AND RETURN - CR = END OF LINE
==703C OUTAL      A000   LDY #00
                  B13A   LDA (PTL),Y      ;GET CHAR
==7040 OUT        8D011A STA ORA3         ;OUTPUT CHAR. TO PRINTER
                  C90D   CMP #$0D         ;CR?
                  F010   BEQ OUT3
==7047 OUT1       AD0D1A LDA IFR3
                  2902   AND #02          ;GET ACKNOW. LINE
                  F0F9   BEQ OUT1         ;NOT SET,LOOP
                  E63A   INC PTL          ;SET FOR NEXT CHAR.
                  D002   BNE OUT2
                  E63B   INC PTH
==7054 OUT2       4C3C70 JMP OUTAL        ;NEXT CHAR.
==7057 OUT3       A9FF   LDA #$FF
                  8581   STA NOPR         ;SET FLAG
                  60     RTS              ;
                  ;MULTIBYTE TRANSFER ON ZERO PAGE
                  ;Y=DEST ADDR.  X=SOURCE ADDR.  A=# OF BYTES+1
==705C TRANB      A903   LDA #03          ;MOVE 4 BYTES
==705E TRANB1     8443   STY DEST
                  8645   STX SOUR         ;STORE IND. ADDR
                  A8     TAY              ;Y=INDEX
                  A900   LDA #00
                  8544   STA DEST+1
                  8546   STA SOUR+1       ;MSB ADDR
==7069 TRANB2     B145   LDA (SOUR),Y     ;GET BYTE
                  9143   STA (DEST),Y     ;STORE IT
                  88     DEY
                  10F9   BPL TRANB2       ;LOOP
                  60     RTS              ;DONE
                  ;TRANSFER MESSAGE TO RAM-STOP WITH CR
==7071 TRANM      A000   LDY #00
                  A200   LDX #00          ;INIT INDEX
==7075 TRANM1     B13A   LDA (PTL),Y      ;GET CHAR.
                  9D0002 STA MESS,X       ;STORE IN RAM
                  C90D   CMP #$0D         ;CR?
                  F00A   BEQ TRANM2       ;YES EXIT
                  E8     INX
                  E63A   INC PTL          ;INC POINTERS
                  D0F2   BNE TRANM1
                  E63B   INC PTH
==7085            4C7570 JMP TRANM1       ;LOOP
==7088 TRANM2     60     RTS              ;
                  ;CLEARS TEMPORARY DATA STORAGE (9 LOC.)
==7089 CLTEM      A208   LDX #08
                  A900   LDA #00
==708D CLTEM1     956B   STA TEMPO,X
                  CA     DEX
                  10FB   BPL CLTEM1
                  60     RTS              ;
                  ;CLEAR M1 & X1
==7093 CLM1       A203   LDX #03
                  A900   LDA #00
==7097 CLM1A      954C   STA X1,X
                  CA     DEX
                  10FB   BPL CLM1A
                  60     RTS              ;
                  ;CLEARS M2 & X2
==709D CLM2       A203   LDX #03
                  A900   LDA #00
```

```
==70A1 CLM2A    9548    STA X2,X
                CA      DEX
                10FB    BPL CLM2A
                60      RTS             ;
                ;CLEARS TOTALS DATA
==70A7 CLTOT    A208    LDX #08
                A900    LDA #00
==70AB CLTOT1   9562    STA CCH,X
                CA      DEX
                10FB    BPL CLTOT1
                60      RTS             ;
                ;TRANSFER UNPACKED BCD TO MESS WITH LEADING ZERO BLANK
                ;Y=BCD INDEX  SCPAD=LSA  SCPAD+1=MSA  SCPAD+2=# TO START
==70B1 BLZE     B97A00 LDA UPBCD,Y      ;GET FIRST #
                D009    BNE BLZE1       ;NOT ZERO
                A920    LDA #$20        ;IS 0- OUTPUT SPACE
                9140    STA (SCPAD),Y   ;STORE SPACE CHAR.
                C8      INY
                C442    CPY SCPAD+2     ;DONE ALL?
                D0F2    BNE BLZE        ;NO, LOOP
                F00B    BEQ BLZE2       ;GO OUTPUT LAST CHAR.
                B97A00 LDA UPBCD,Y      ;;GET #
                0930    ORA #$30 <ASCKI CONVERT
                9140    STA (SCPAD),Y   ;STORE CHAR.
                C8      INY
                4CBF70 JMP BLZE1        ;LOOP
==70CE BLZE2    B97A00 LDA UPBCD,Y      ;GET LAST CHAR.
                0930    ORA #$30
                9140    STA (SCPAD),Y   ;STORE LAST CHAR.
                60      RTS             ;
                ;3BYTE DIV BY 4  M2=MSB  M2+2=LSB
==70D6 DIVI4    4649    LSR M2
                664A    ROR M2+1
                664B    ROR M2+2
                4649    LSR M2
                664A    ROR M2+1
                664B    ROR M2+2
                60      RTS             ;
                ;UNPACK 3 BYTES PACKED BCD
                ;M1=MSB BCD   M1+2=LSB BCD
                ;DEST= WHERE TO STORE
==70E3 UNPKD    A202    LDX #02         ;PACKED INDEX
                A005    LDY #05         ;UNPACKED INDEX
==70E7 UNPKD1   B54D    LDA M1,X        ;GET DATA
                48      PHA             ;SAVE
                290F    AND #$0F        ;GET RT. HALF
                9143    STA (DEST),Y    ;STORE
                88      DEY
                68      PLA             ;GET DATA BACK
                4A      LSR A
                4A      LSR A
                4A      LSR A
                4A      LSR A           ;MOVE TO LOWER HALF
                9143    STA (DEST),Y    ;STORE
                88      DEY
==70F7          CA      DEX             ;NEXT BYTE
                10ED    BPL UNPKD1      ;LOOP
                60      RTS             ;
                ;UNFLOAT RESULTS OF MUL OR DIV
                ;INTEGERS IN M1 - DECIMAL PORTION IN E
==70FB FIX1     A54C    LDA X1          ;GET EXPONENT
                C996    CMP #$96        ;$80=0 EXP +22 FOR 3 BYTES
                D001    BNE FIX1A       ;CONTINUE
                60      RTS
==7102 FIX1A    464D    LSR M1          ;SHIFT RT UNTILL E1=$96
                664E    ROR M1+1
                664F    ROR M1+2
```

```
                6650    ROR M1+3            ;START OF E
                6651    ROR M1+4
                6652    ROR M1+5
                E64C    INC X1
                4CFB70  JMP FIX1            ;LOOP
==7113                  ;FIX DECIMAL PORTION OF MUL OR DIV
                        ;E=MSB DECIMAL  E+2=LSB DECIMAL
                        ;RESULT IN M1
==7113 FIX2     A900    LDA #00
                8549    STA M2
                A9C3    LDA #$C3
                854A    STA M2+1
                A950    LDA #$50
                854B    STA M2+2            ;BIN. 50,000 (INIT M2 = .50000)
                A018    LDY #$18            ;INIT FOR 3 BYTE LEFT SHIFT
                A550    LDA E               ;GET MSB
==7123          1003    BPL FIX2B           ;HIGH BIT NOT SET
==7125 FIX2A    20D465  JSR ADD             ;ADD M2 TO M1- STORE M1
==7128 FIX2B    88      DEY
                D001    BNE FIX2C           ;NOT DONE YET
                60      RTS
==712C FIX2C    464A    LSR M2+1
                664B    ROR M2+2            ;DIVIDE ADDEND BY 2
                0652    ASL E+2
                2651    ROL E+1
                2650    ROL E               ;NEXT MS BIT
                10F0    BPL FIX2B           ;NOT SET-SKIP PARTIAL ADD
                30EB    BMI FIX2A           ;SET-ADD NEXT HALF
                        .FILE SHET

                --------------------
                SHIFT IN TELLER DATA

                --------------------

                                            ;

                ;***** SHET ********

==713A SHET     A201    LDX #$01            ;START OF TELLER INDEX
                207A71  JSR SHET6
                AD0A18  LDA SR1             ;START SR
==7142 SHET1    207071  JSR SHET5           ;WAIT FOR 8 SHIFTS
                AD0A18  LDA SR1             ;READ DATA
                9500    STA TTEMP,X         ;STORE DATA
                E8      INX                 ;POINT TO NEXT TELLER LOCATION
                E019    CPX #$19            ;DONE 24 TELLERS YET?
                D0F3    BNE SHET1           ;NO, REPEAT
                207071  JSR SHET5           ;CLEAR LAST SHIFTS
==7152          207A71  JSR SHET6           ;RELOAD SHIFT REG
                A201    LDX #01             ;CHECK DATA
                AD0A18  LDA SR1
==715A SHET2    207071  JSR SHET5           ;8 SHIFTS
                AD0A18  LDA SR1             ;GET DATA
                D500    CMP TTEMP,X         ;DATA MATCH?
                F006    BEQ SHET3           ;YES
                207071  JSR SHET5           ;NO,CLEAR SR
                4C3A71  JMP SHET            ;START ALL OVER AGAIN
==716A SHET3    E8      INX
                E019    CPX #$19            ;DONE 24 TELLERS YET?
                D0EB    BNE SHET2           ;NO, REPEAT
                60      RTS                 ;RETURN TO MAIN LOOP
                        ;CHECKS FOR 8 SHIFTS
==7170 SHET5    AD0D18  LDA IFR1
                2904    AND #04             ;MASK OUT FLAG
                C904    CMP #04             ;DONE 8 SHIFTS YET?
                D0F7    BNE SHET5           ;NO
```

```
                        60      RTS                     ;YES RETURN
                        ;STROBE TELLER SHIFT REG.'S
==717A SHET6            A980    LDA #$80
                        8D0018  STA ORB1                ;STROBE HIGH
                        A004    LDY #04
==7181 SHET6A           88      DEY
                        10FD    BPL SHET6A              ;IDLE TIME
                        A900    LDA #00
                        8D0018  STA ORB1                ;STROBE LOW
                        60      RTS                     ;

                                                        ;
                        ;****** PROT *******
                        ;
==718A PROT             A900    LDA #00
                        8559    STA TCF                 ;CLEAR TELLER CALL FLAG
                        A201    LDX #01                 ;INIT X
==7190 PROT1            B500    LDA TTEMP,X             ;GET DATA
                        1047    BPL PROT7               ;NOT OPEN
                        2904    AND #04                 ;MASK AUTOCALL BIT
                        F003    BEQ PROT2               ;NOT AUTOCALL
                        4C2472  JMP ACAL                ;GO TO AUTOCALL ROUTINE
==719B PROT2            EA      NOP
                        EA      NOP
                        EA      NOP
==719E PROT3            B500    LDA TTEMP,X
                        2908    AND #08                 ;CANCEL BIT
                        F003    BEQ PROT4               ;CANCEL NOT SET
                        4CFD71  JMP REMOVE              ;GO REMOVE CALL
==71A7 PROT4            B519    LDA TPERM,X
                        2A      ROL A                   ;MAN CALL IN BIT 7
                        100D    BPL PROT6               ;NO CALL LAST TIME
                        A940    LDA #$40
                        1500    ORA TTEMP,X             ;ADD MAN CALL TO TTEMP
                        9500    STA TTEMP,X
==71B2 PROT5            A9FF    LDA #$FF
                        8559    STA TCF                 ;SET TELLER CALL FLAG
                        4CE871  JMP PROT8
==71B9 PROT6            B500    LDA TTEMP,X
                        2A      ROL A                   ;MAN CALL THIS TIME ?
                        102A    BPL PROT8               ;NO
                        8A      TXA                     ;SAVE X
                        A656    LDX TNI                 ;NEXT IN
                        CA      DEX
                        D002    BNE PROT6A              ;ZERO CHECK
                        A264    LDX #100                ;RESET POINTER
==71C6 PROT6A           E455    CPX TNO                 ;OVERLAP?
                        D00A    BNE PROT6B              ;NO
                        AA      TAX                     ;RESTORE X
                        A9BF    LDA #$BF
                        3500    AND TTEMP,X             ;REMOVE CALL
                        9500    STA TTEMP,X
                        4CE871  JMP PROT8
==71D4 PROT6B           AA      TAX                     ;RESTORE
                        209B72  JSR INFO                ;PUT CALL IN FIFO
                        4CB271  JMP PROT5               ;GO SET TCF
==71DB PROT7            A9BF    LDA #$BF
                        3500    AND TTEMP,X             ;REMOVE MAN CALL
                        9500    STA TTEMP,X
                        B519    LDA TPERM,X
                        1003    BPL PROT8               ;NOT OPEN LAST TIME
                        4CFD71  JMP REMOVE              ;WAS OPEN - NOT NOW
==71E8 PROT8            B519    LDA TPERM,X
                        6A      ROR A                   ;DISPLAY BIT IN CARRY
                        9006    BCC PROT9               ;NOT SET
                        A901    LDA #01
```

```
                   1500    ORA TTEMP,X
                   9500    STA TTEMP,X        ;SET IT
==71F3 PROT9       B500    LDA TTEMP,X
                   9519    STA TPERM,X        ;TRANSFER TO PERM
                   E8      INX
                   E019    CPX #25            ;DONE ALL YET?
                   D094    BNE PROT1          ;NO, LOOP
                   60      RTS                ;ALL DONE, EXIT
                   ;REMOVE CALL FROM FIFO
==71FD REMOVE      8A      TXA                ;A = TELLER #
                   A655    LDX TNO            ;NEXT OUT POINTER
==7200 REFI1       D582    CMP TFI,X          ;EQUAL ?
                   F00B    BEQ REFI3          ;YES
                   CA      DEX
                   D002    BNE REFI2          ;LOWER BOUNDRY
                   A264    LDX #100           ;RESET FOR UPPER
==7209 REFI2       E456    CPX TNI            ;CHECKED ALL ?
                   F005    BEQ REFI4          ;YES
                   D0F1    BNE REFI1          ;LOOP
==720F REFI3       38      SEC
                   7682    ROR TFI,X          ;SET BIT 7 HIGH FOR CANCEL
==7212 REFI4       AA      TAX                ;RESTORE X
                   29BE    AND #$BE
                   3500    AND TTEMP,X
                   9500    STA TTEMP,X        ;REMOVE MAN CALL
                   ;AND SIGN DISPLAY FLAG
                   A900    LDA #00
                   9D0003  STA TIMA,X
                   9D1A03  STA TIMB,X
                   4CF371  JMP PROT9
==7224             ;
                   ;AUTOCALL ADDITIONS
                   ;
==7224 ACAL        B500    LDA TTEMP,X
                   2920    AND #$20           ;DETECT CAR ?
                   F03A    BEQ ACAL5          ;NO
                   B519    LDA TPERM,X
                   2920    AND #$20           ;DETECT CAR LAST TIME ?
                   F003    BEQ ACAL1          ;NO
                   4C9E71  JMP PROT3
==7233 ACAL1       FE3403  INC CCTL,X         ;ADD A CUST. COUNT
                   D003    BNE ACAL2          ;NO LOOP AROUND
                   FE4E03  INC CCTM,X         ;INC'T HIGH COUNT
==723B ACAL2       B519    LDA TPERM,X
                   6A      ROR A              ;DISPLAY BIT IN CARRY
                   B010    BCS ACAL4          ;YES SIGN HAS DISPLAYED
                   2A      ROL A
                   2A      ROL A              ;MAN CALL IN BIT 7
                   1003    BPL ACAL3          ;NO MAN CALL LAST TIME
                   4CFD71  JMP REMOVE         ;HAD CALL - GO REMOVE
==7247 ACAL3       A9BF    LDA #$BF
                   3500    AND TTEMP,X
                   9500    STA TTEMP,X        ;REMOVE MAN CALL
                   4C9E71  JMP PROT3
==7250 ACAL4       A9BE    LDA #$BE           ;REMOVE MAN CALL & DISPLAY BIT
                   3519    AND TPERM,X
                   9519    STA TPERM,X
                   A9BE    LDA #$BE
                   3500    AND TTEMP,X
                   9500    STA TTEMP,X
==725C ACAL4A      A900    LDA #00
                   9D0003  STA TIMA,X         ;RESET
                   4C9E71  JMP PROT3
==7264 ACAL5       B519    LDA TPERM,X
                   6A      ROR A              ;HAS SIGN DISPLAYED # ?
                   9019    BCC ACAL7          ;NO
```

```
                BD0003 LDA TIMA,X
                CD001B CMP STIMA          ;TIME SINCE CAR LEFT SIGN
                B003   BCS ACAL6          ;YES
                4C9E71 JMP PROT3
==7274 ACAL6    A940   LDA #$40
                1500   ORA TTEMP,X
                9500   STA TTEMP,X        ;ADD MAN CALL
                A9FE   LDA #$FE
                3519   AND TPERM,X
                9519   STA TPERM,X        ;RESET DISPLAY BIT
                D0DA   BNE ACAL4A         ;RESET TIMA
==7282 ACAL7    BD1A03 LDA TIMB,X
                CD011B CMP STIMB          ;TIME SINCE CAR LEFT WINDOW
                B003   BCS ACAL8          ;YES
                4C9E71 JMP PROT3
==728D ACAL8    A900   LDA #00
                9D1A03 STA TIMB,X         ;RESE
                A940   LDA #$40
                1500   ORA TTEMP,X
                9500   STA TTEMP,X        ;ADD MAN CALL
                4C9E71 JMP PROT3          ;
                ;PUT CALL IN FIFO
==729B INFO     A456   LDY TNI            ;TELLER NEXT IN POINTER
                8A     TXA
                998200 STA TFI,Y          ;STORE TELLER #
                88     DEY
                C000   CPY #00
                D002   BNE INFO1
                A064   LDY #100           ;RESET POINTER
==72A8 INFO1    8456   STY TNI            ;REPLACE POINTER
                60     RTS                ;
                       .FILE TOUT

                ---------------------
                OUTPUT TO SUPERVISORS

                ---------------------
                     AND TELLERS

                ---------------------
                                          ;
                ;SET PAGE
==72AB SETP     A219   LDX #$19           ;INIT X
                A900   LDA #00
                8580   STA PAGE           ;CLEAR RAM
==72B1 SETP1    B519   LDA TPERM,X
                2910   AND #$10           ;PAGE BIT
                D006   BNE SETP2          ;SET RAM
                CA     DEX                ;CHECK NEXT
                F007   BEQ SETP3          ;CHECKED ALL
                4CB172 JMP SETP1          ;LOOP
==72BD SETP2    A902   LDA #02
                8580   STA PAGE           ;SET IT
==72C1 SETP3    60     RTS                ;
                ;****** TOUT *******

==72C2 TOUT     20AB72 JSR SETP           ;SET PAGE BIT
                A21F   LDX #31            ;BASE 10
==72C7 TOUT1    B519   LDA TPERM,X        ;GET SIGN DATA (MSB)
                2920   AND #$20           ;MASK
                0901   ORA #01            ;TO BLANK DISPLAY
                0580   ORA PAGE
                8D0118 STA ORA1           ;STORE DATA
                20FC72 JSR TOUT4          ;CLK DATA
                CA     DEX
                E018   CPX #24            ;1ST 6 DONE YET?
```

```
==72D8          DØED    BNE TOUT1       ;NOT YET, DO AGAIN
==72DA TOUT2    B519    LDA TPERM,X     ;MAINTAIN BLANK
                29FD    AND #$FD        ;REMOVE D1
                EØØ1    CPX #Ø1         ;LAST TIME?
                FØ15    BEQ TOUT2A      ;YES
                Ø9Ø1    ORA #Ø1
==72E4 TOUT2B   Ø58Ø    ORA PAGE
                8DØ118  STA ORA1        ;OUTPUT DATA
                2ØFC72  JSR TOUT4       ;CLK
                CA      DEX
                EØØØ    CPX #ØØ         ;LAST TIME?
                DØE9    BNE TOUT2       ;NO
                A58Ø    LDA PAGE
                8DØ118  STA ORA1        ;OUTPUT
==72F6          6Ø      RTS
==72F7 TOUT2A   29FE    AND #$FE        ;UNBLANK
==72F9 TOUT3    4CE472  JMP TOUT2B
==72FC TOUT4    A94Ø    LDA #$4Ø
                8DØØ18  STA ORB1        ;CLK HIGH
                AØØ4    LDY #Ø4
==73Ø3 TOUT4A   88      DEY
                1ØFD    BPL TOUT4A      ;WASTE TIME
                A9ØØ    LDA #ØØ
                8DØØ18  STA ORB1        ;CLK LOW
                6Ø      RTS             ;
                --------------------
                SHIFT IN SIGN DATA
                --------------------
                    AND CHECK
                --------------------
                                        ;
                ;******* SHIS *******
==73ØC SHIS     A2ØØ    LDX #ØØ         ;INIT. X
==73ØE SHIS1    A98Ø    LDA #$8Ø
                8DØØ19  STA ORB2        ;ENABLE SIGN SHIFT REG.
                ADØA19  LDA SR2         ;START SHIFT REG
                2Ø4273  JSR SHIS5       ;CHECK FOR 8 SHIFTS
                A9ØØ    LDA #ØØ
                8DØØ19  STA ORB2        ;DISABLE SGN SR
==731E          ADØA19  LDA SR2         ;SHIFT FOR DATA
                2Ø4273  JSR SHIS5       ;CLEAR SHIFTS
                EØØ1    CPX #Ø1         ;2ND TIME THRU
                FØØC    BEQ SHIS2       ;YES
                ADØA19  LDA SR2         ;GET FIRST TIME DATA
                8537    STA STEMP
                2Ø4273  JSR SHIS5       ;CLEAR LAST SHIFTS
==733Ø          E8      INX
                4CØE73  JMP SHIS1       ;GO CHECK DATA
==7334 SHIS2    ADØA19  LDA SR2         ;GET 2ND TIME DATA
                C537    CMP STEMP       ;CHECK DATA
                FØØ6    BEQ SHIS3       ;MATCH - EXIT
                2Ø4273  JSR SHIS5       ;CLEAR SHIFTS
                4CØC73  JMP SHIS        ;DATA MISMATCH - START OVER
==7341 SHIS3    6Ø      RTS             ;EXIT
                ;----- CHECKS FOR 8 SHIFTS -----
==7342 SHIS5    ADØD19  LDA IFR2
                29Ø4    AND #$Ø4        ;MASK BIT
                C9Ø4    CMP #$Ø4        ;DONE 8 SHIFTS YET
                DØF7    BNE SHIS5       ;NO
                6Ø      RTS             ;YES - RETURN
```

```
--------------------
PROCESS SIGN INFO

--------------------
                                                ;
               ;****** PROS *******
               ;
==734C PROS    A900   LDA #00
               855A   STA CWF           ;CLEAR CAR WAITING FLAG
               A201   LDX #01
==7352 PROS1   2637   ROL STEMP         ;SIGN BY X IN CARRY
               901C   BCC PROS4         ;NO CAR
               A9FF   LDA #$FF
               855A   STA CWF           ;SET CAR WAITING FLAG
               A902   LDA #02
               3532   AND SPERM,X       ;CAR LAST TIME?
               D008   BNE PROS2         ;YES
               20CD73 JSR LOOP          ;CHECK FOR OVERLAP
==7363         B005   BCS PROS2A        ;IF RET W/CARRY - OVERLAP
               20BD73 JSR SIIN          ;NO, ENTER IN FIFO
==7368 PROS2   A922   LDA #$22
==736A PROS2A  9532   STA SPERM,X       ;STORE CAR PRESENT
==736C PROS3   E8     INX               ;NEXT SIGN
               E005   CPX #05           ;ALL 4 SIGNS
               D0E1   BNE PROS1         ;NO
               60     RTS               ;YES EXIT
==7372 PROS4   A902   LDA #02
               3532   AND SPERM,X       ;CAR LAST TIME?
               D007   BNE PROS5         ;YES
==7378 PROS4A  A9DC   LDA #$DC
               3532   AND SPERM,X       ;REMOVE DET BIT
               4C6A73 JMP PROS2A        ;GO STORE IT
==737F PROS5   A55E   LDA SID           ;IS SIGN DISPLAYING?
               F011   BEQ PROS8         ;NO REMOVE CALL FROW FIFO
               A55F   LDA SIOUT         ;GET CURRENT SIGN OUTPUT
               2A     ROL A
               2A     ROL A
               2A     ROL A
               2A     ROL A             ;SIGN # IN LSB
               2907   AND #07           ;MASK #
               8540   STA SCPAD
               E440   CPX SCPAD         ;SIGN OUTPUT = X
==738F         D003   BNE PROS8         ;NO REMOVE CAR FROM FIFO
               4C7873 JMP PROS4A        ;YES GO STORE DATA
               ;REMOVE CALL FROM FIFO
==7394 PROS8   8A     TXA               ;A=SIGN #
               A657   LDX SNO           ;X=NEXT OUT
==7397 PROS8A  D5E6   CMP SFI,X         ;IS ENTRY = X(A)
               F015   BEQ PROS8D        ;YES, GO CANCEL
               E458   CPX SNI           ;NEXT IN
               F00D   BEQ PROS8C        ;YES, CHECKED ALL
               E000   CPX #00           ;END OF FIFO?
               F004   BEQ PROS8B        ;YES, RESET POINTER
               CA     DEX
               4C9773 JMP PROS8A        ;CMP NEXT LOCATION
==73A7 PROS8B  A219   LDX #25
               4C9773 JMP PROS8A        ;RESET POINTER
==73AC PROS8C  AA     TAX               ;GET ORIGINAL X BACK
               4C7873 JMP PROS4A        ;RET
==73B0 PROS8D  8540   STA SCPAD         ;SAVE
               A980   LDA #$80
               15E6   ORA SFI,X         ;SET HIGH BIT FOR CANCEL
               95E6   STA SFI,X         ;STORE IT
               A640   LDX SCPAD         ;GET ORIGINAL X BACK
               4C7873 JMP PROS4A        ;RETURN
               ;PUT SIGN REQUEST IN FIFO
```

```
==73BD SIIN     8A     TXA                 ;STORE X IN A
                A658   LDX SNI             ;GET NEXT IN POINTER
                95E6   STA SFI,X           ;STORE SIGN # IN FIFO
                CA     DEX
                E000   CPX #00             ;END OF FIFO?
                D002   BNE SIIN1           ;NO
                A219   LDX #25             ;TOP OF FIFO
==73C9 SIIN1    8658   STX SNI REPLACE POINTER
                AA     TAX                 ;REPLACE X
                60     RTS                 ;
==73CD LOOP     8A     TXA                 ;SAVE X
                A658   LDX SNI             ;NEXT IN
                CA     DEX                 ;NEXT POSITION
                D002   BNE LOOP1           ;CHECK LIMITS
                A219   LDX #25             ;RESET
==73D5 LOOP1    E457   CPX SNO             ;OVERLAP?
                F003   BEQ LOOP2           ;YES
                AA     TAX                 ;RESTORE X
                18     CLC
                60     RTS
==73DC LOOP2    AA     TAX
                A920   LDA #$20
                38     SEC
                60     RTS                 ;
                       .FILE SOUT
                ---------------------
                 NEED TO DISPLAY

                ---------------------
                & OUTPUT TO SIGN

                ---------------------

                                           ;
                ;******* SOUT ******

==73E1 SOUT     A55E   LDA SID             ;GET SIGN DISPLAY BIT
                F003   BEQ SOUTA           ;SIGN IS NOT DISPLAYING
                4C4574 JMP SOUT5           ;SIGN IS DISPLAYING
==73E8 SOUTA    A55C   LDA TIMD            ;TIME BETWEEN DISPLAYS
                CD031B CMP STIMD           ;< SET TIME?
                9055   BCC SOUT4           ;TIMER NOT SET - EXIT
                A9FF   LDA #$FF            ;YES TIMER SET
                C55A   CMP CWF             ;CAR WAITING FLAG SET
                D04F   BNE SOUT4           ;NO EXIT
                A559   LDA TCF             ;TELLER CALL FLAG SET?
                F04B   BEQ SOUT4           ;NO - EXIT
==73F9          ;CONDITIONS ARE MET - OUTPUT
                A655   LDX TNO             ;GET TELLER NEXT OUT POINTER
==73FB SOUT1A   B582   LDA TFI,X           ;GET DATA FROM TELLER FIFO
==73FD SOUT1B   CA     DEX
                D002   BNE SOUT1
                A264   LDX #100            ;RESET
==7402 SOUT1    8655   STX TNO             ;REPLACE POINTER
                AA     TAX                 ;A TO X
                BD5E75 LDA SKIP,X          ;SKIP THIS TELLER?
                F03A   BEQ SOUT4           ;YES EXIT TILL NEXT TIME
                8A     TXA
                18     CLC
                6D7975 ADC OFFSET          ;ADD
                855F   STA SIOUT           ;STORE OUTPUT
                A657   LDX SNO             ;GET SIGN FIFO POINTER(NEXTOUT)
==7413 SOUT2A   8657   STX SNO
                B5E6   LDA SFI,X           ;GET DATA - SIGN FIFO
==7417 SOUT2    CA     DEX
                D002   BNE SOUT2B
                A219   LDX #25             ;RESET POINTER
```

```
==741C SOUT2B    8657    STX SNO           ;REPLACE POINTER
                 2907    AND #07           ;MASK BITS
                 2A      ROL A             ;MOVE TO MSB
                 2A      ROL A
                 2A      ROL A
                 2A      ROL A
                 2A      ROL A
                 29E0    AND #$E0          ;MAKE SURE LOWER BITS CLEAR
                 055F    ORA SIOUT         ;ADD TO SIGN OUTPUT
                 855F    STA SIOUT
                 8D0A1A  STA SR3           ;SHIFT OUT DATA
==742E SOUT3     AD0D1A  LDA IFR3          ;CHECK FOR 8 SHIFTS
                 2904    AND #04
                 C904    CMP #04           ;8 SHIFTS YET?
                 D0F7    BNE SOUT3         ;NO LOOP
                 A900    LDA #00
                 8D001A  STA ORB3          ;SET MASTER ENABLE
                 A9FF    LDA #$FF
==743E           855E    STA SID           ;SET SIGN DISPLAYING FLAG
                 A900    LDA #00
                 855C    STA TIMD          ;RESET TIMER
==7444 SOUT4     60      RTS               ;
                 ;SIGN DISPLAYING-HAS IT TIMED OUT OR CAR LEFT ?
==7445 SOUT5     A55F    LDA SIOUT         ;GET SIGN OUTPUT
                 2A      ROL A
                 2A      ROL A
                 2A      ROL A
                 2A      ROL A             ;MOVE TO LSB
                 2907    AND #07           ;MASK SIGN #
                 AA      TAX
                 B532    LDA SPERM,X
                 2902    AND #02
                 F007    BEQ SOUT6         ;CAR HAS LEFT
                 A55B    LDA TIMC          ;DISPLAY TIME
==7456           CD021B  CMP STIMC         ;< SET TIME?
                 90E9    BCC SOUT4         ;NO, EXIT
==745B SOUT6     A9FF    LDA #$FF          ;TIMER IS SET
                 8D001A  STA ORB3          ;RESET MASTER ENABLE
                 A900    LDA #00
                 855B    STA TIMC          ;RESET TIMER
                 855E    STA SID           ;RESET SIGN DISPLAY FLAG
                 9532    STA SPERM,X       ;RESET SIGN PERM.
                 A55F    LDA SIOUT
                 291F    AND #$1F          ;MASK TELLER #
==746C           38      SEC
                 ED7975  SBC OFFSET        ;RESTORE X INDEX
                 AA      TAX
                 A901    LDA #01
                 1519    ORA TPERM,X       ;SET SIGN DISPLAY BIT
                 29BF    AND #$BF          ;CLEAR MAN CALL
                 9519    STA TPERM,X
                 60      RTS

                 --------------------
                 TIMER UPDATE

                 --------------------

                                           ;

                 ;****** TIMU *******

==747A TIMU      A538    LDA TIMER         ;CHECK TIMER INTER. FLAG
                 F04E    BEQ TIMU5         ;NOT SET- EXIT
                 A900    LDA #00           ;YES, TIMER IS SET
                 8538    STA TIMER         ;RESET FLAG
                 A201    LDX #01           ;FIRST TELLER LOC.
```

```
==7484 TIMU1    B519   LDA TPERM,X
                1026   BPL TIMU2           ;NOT OPEN
                FE6803 .NC TTOL,X          ;INC'MT TIME OPEN
                D003   BNE TIMU1B
                FE8203 INC TTOM,X          ;MSB
==7490 TIMU1B   8540   STA SCPAD
                A904   LDA #04
                2440   BIT SCPAD           ;AUTOCALL ON?
                F016   BEQ TIMU2           ;NO
                A920   LDA #$20
                2440   BIT SCPAD
                D018   BNE TIMU3           ;CAR PRESENT
                700E   BVS TIMU2           ;MAN CALL
==74A0          B519   LDA TPERM,X
                6A     ROR A               ;DISPLAY BIT IN CARRY
                B006   BCS TIMU1A          ;YES SIGN HAS DISPLAYED
                FE1A03 INC TIMB,X          ;INC TIME CAR LEFT WINDOW
                4CAE74 JMP TIMU2
==74AB TIMU1A   FE0003 INC TIMA,X          ;TIME CAR LEFT SIGN
==74AE TIMU2    E8     INX                 ;INC'MT X POINTER
                E019   CPX #$19            ;DONE 24 TELLERS YET?
                D0D1   BNE TIMU1           ;NO, REPEA
                4CC174 JMP TIMU4           ;YES GO CHECK SIGN TIMERS
==74B6 TIMU3    FE9C03 INC TTBL,X
                D0F3   BNE TIMU2
                FEB603 INC TTBM,X          ;ADD 1 TO HIGH CT.
                4CAE74 JMP TIMU2
==74C1 TIMU4    A55E   LDA SID             ;SIGN DISPLAY FLAG
                F005   BEQ TIMU4A          ;SIGN NOT DISPLAYING
                E65B   INC TIMC            ;YES INC TIME SIGN DISPLAYS
                4CCC74 JMP TIMU5
==74CA TIMU4A   E65C   INC TIMD            ;INC.TIME BETWEEN BETWEEN DISPL
==74CC TIMU5    EA     NOP
                EA     NOP
                EA     NOP
                60     RTS
                       .FILE SEQ           ;
                ;******* INT *******
                ;INTERUPT ROUTINE
==74D0 IRQ                                 ;
==74D0 INT      78     SEI                 ;SET INTERUPT
                48     PHA                 ;SAVE A
                8A     TXA
                48     PHA                 ;SAVE X
                98     TYA
                48     PHA                 ;SAVE Y
                2C0D19 BIT IFR2            ;VIA2
                300C   BMI INT1            ;YES SET
                EA     NOP
                EA     NOP
                EA     NOP
                4C0975 JMP INT6            ;NO VALID INTERUPT
==74E1                 *=*+6               ;EXPANSION
==74E7 INT1     A0FF   LDY #$FF            ;TO SET FLAGS
                AD0119 LDA ORA2            ;GET DATA
                EA     NOP
                EA     NOP
                EA     NOP
                0A     ASL A
                3004   BMI INT2            ;NOT ALL PRINT
                843D   STY ALPR            ;SET IT
                1013   BPL INT6            ;EXIT
==74F6 INT2     0A     ASL A
                3004   BMI INT3            ;NOT ALL CLEAR
                843E   STY ALCR            ;SET IT
                100C   BPL INT6            ;EXIT
```

```
==74FD INT3     0A      ASL A
                3004    BMI INT4        ;NOT LINE FEED
                843F    STY LINE        ;SET IT
                1005    BPL INT6        ;EXIT
==7504 INT4     8438    STY TIMER       ;IF NONE ABOVE, SET TIME
==7506 INT5     EA      NOP
                EA      NOP
                EA      NOP
==7509 INT6     68      PLA
                A8      TAY             ;RESTORE Y
                68      PLA
                AA      TAX             ;RESTORE X
                68      PLA             ;RESTORE A
                58      CLI
                40      RTI             ;RETURN
                --------------------
                MAIN SEQUENCER

                --------------------
                                        ;

                ;******* SEQ *******
                ;MAIN LOOP & SEQUENCER
                ;
==7510 SEQ      EA      NOP
                EA      NOP
                EA      NOP
==7513 SEQ1     203A71 JSR SHET         ;SHIFT IN TELLER DATA & CHECK
                EA      NOP
                EA      NOP
                EA      NOP
                208A71 JSR PROT         ;PROCESS TELLER DATA
                EA      NOP
                EA      NOP
                EA      NOP
                20C272 JSR TOUT         ;OUTPUT TO SUPERVISOR PANEL
                EA      NOP
==7523          EA      NOP
                EA      NOP
                200C73 JSR SHIS         ;SHIFT IN SIGN DATA
                EA      NOP
                EA      NOP
                EA      NOP
                204C73 JSR PROS         ;PROCESS SIGN DATA
                EA      NOP
                EA      NOP
                EA      NOP
                207A75 JSR STACHK
==7534          EA      NOP
                EA      NOP
                EA      NOP
                20E173 JSR SOUT         ;CHECK & UPDATE SIGN
                EA      NOP
                EA      NOP
                EA      NOP
                EA      NOP
                EA      NOP
                EA      NOP
                207A74 JSR TIMU         ;CHECK TIMER FLAG &
                ;UPDATE TELLER TIMERS
                EA      NOP
==7544          EA      NOP
                EA      NOP
                EA      NOP
                EA      NOP
                EA      NOP
                EA      NOP
                EA      NOP
```

```
                EA      NOP
                EA      NOP
                EA      NOP
                EA      NOP
                200070 JSR PRCHK        ;CHECK PRINTER FLAGS &
                ;AND OUTPUT 1 LINE TO PRINTER
                EA      NOP
                EA      NOP
==7554          EA      NOP
                EA      NOP
                EA      NOP
                EA      NOP
                4C1375 JMP SEQ1         ;REPEAT LOOP
                ;
                ;NMI COMES HERE
==755B NMI      40      RTI             ;SPACE FOR DEMO PROGRAM HERE
                EA      NOP
                EA      NOP             ;SKIP # IN DISPLAY
                ;PUT BYTE (INDEX) LOW IF SKIPPED
==755E SKIP     FF      .BYTE $FF,$FF,$FF,$FF,$FF
                FF
                FF
                FF
                FF
                FF      .BYTE $FF,$FF,$FF,$FF,$FF
                FF
                FF
                FF
                FF
                FF      .BYTE $FF,$FF,$FF,$FF,$FF
                FF
                FF
                FF
                FF
                FF      .BYTE $FF,$FF,$FF,$FF,$FF
==756E          FF
                FF
                FF
                FF
                FF      .BYTE $FF,$FF,$FF,$FF,$FF
                FF
                FF
                FF
                FF
==7577 WARM     72A3    .WORD $A372     ;COLD OR WARM RESET
==7579 OFFSET   00      .BYTE 0         ;TELLER OFFSET NUMBER
                ;CHECK FIFOS FOR CANCELED CALLS
==757A STACHK   A655    LDX TNO         ;NEXT OUT
                E456    CPX TNI         ;CHECKED
                F011    BEQ CHK2A       ;ALL?
==7580 CHK1     8655    STX TNO         ;STORE IT
                B582    LDA TFI,X       ;GET FIFO ENTRY
                100F    BPL CHK3        ;VALID ENTRY
                CA      DEX             ;NEXT ENTRY
                D002    BNE CHK2B       ;CHECK FOR BOTTOM
                A264    LDX #100        ;RESET FOR TOP
==758B CHK2B    E456    CPX TNI         ;CHECKED ALL?
                D0F1    BNE CHK1        ;NO - REPEAT
                8655    STX TNO         ;NO VALID ENTRIES
==7591 CHK2A    A900    LDA #00         ;RESET FLAG
                8559    STA TCF
==7595 CHK3     A657    LDX SNO         ;SIGN NEXT OUT
                E458    CPX SNI         ;DO IT AGAIN FOR
                F011    BEQ CHK5A       ;SIGN FIFO
```

```
==759B CHK4     8657    STX SNO
                B5E6    LDA SFI,X
                100F    BPL CHK6
                CA      DEX
                D002    BNE CHK5
                A219    LDX #25
==75A6 CHK5     E458    CPX SNI
                D0F1    BNE CHK4
                8657    STX SNO
==75AC CHK5A    A900    LDA #00
                865A    STX CWF
==75B0 CHK6     60      RTS
                        .FILE FORM       ;
                ;** PRINT FORMATES **
                ;
                ;HEADER
==75B1 HEAD     0E      .BYTE $0E,'     *AUTOGUIDE*    ',$0D
                2020
==75C5          0D
                0E      .BYTE $0E,'     TELLER DATA',$0F,$0D,$0D
                2020
==75D7          0F
                0D
                0D
                2020    .BYTE '     TIME:',95,95,95,95,95,95,95,95,95
                5F
                5F
                5F
==75E7          5F
                5F
                5F
                5F
                5F
                5F
                2020    .BYTE '  DATE:',95,95,95,95,95,95,95,95,95,13,13
                5F
                5F
                5F
==75F7          5F
                5F
                5F
                5F
                5F
                5F
                0D
                0D
==75FF UNDER    2D2D    .BYTE '--------------------'
==7613          2D2D    .BYTE '--------------------',$0D
==7627          0D
                2020    .BYTE '                 TIME  '
==763C          2020    .BYTE '  #     AVG.      %  ',$0D
==7650          0D
                2020    .BYTE '          TIME   WITH  '
==7665          2020    .BYTE '  OF    TIME/  TIME ',$0D
==7679          0D
                4C4F    .BYTE 'LOC.   OPEN   CUST. '
==768E          2043    .BYTE ' CUST.  CUST.  BUSY ',$0D
==76A2          0D
                2D2D    .BYTE '--------------------'
==76B7          2D2D    .BYTE '--------------------',$0D
==76CB          0D                      ;
                ;DATA LINE
==76CC DATA     2320    .BYTE '#                    '
==76E0          2020    .BYTE '         .       . % ',$0D
==76F4          0D                      ;
                ;
```

```
==76F5 TNUM      2020    .BYTE '   TOTAL NUMBER OF'
==7706           2043    .BYTE ' CUSTOMERS:          ',$0D
==771A           0D                         ;
                 ;
==771B AVT       4156    .BYTE 'AVERAGE TIME WITH '
==772D           4355    .BYTE 'CUSTOMERS:    .    ','MIN.',$0D
==773E           4D49
                 0D                         ;
                 ;
==7743 TWORK     2020    .BYTE '          TOTAL % '
==7755           5449    .BYTE 'TIME BUSY:    .   %  ',$0D ;
==7769           0D                         ;
                 ;
==776A OVERM     4F56    .BYTE 'OVERFLOW'
==7772 CLMESS    2020    .BYTE '        ALL COUNTERS'
==7786           2041    .BYTE ' ARE CLEARED',$0D
                 0D                         ;
==7793 TRMESS    0E      .BYTE $0E,'     ACTRON INC.',$0F,$0D
                 2020
==77A4           0F
                 0D
                 2031    .BYTE ' 1351 JARVIS AVE., '
==77B9           454C    .BYTE 'ELK GROVE, IL  60007',$0D
==77CD           0D
                 2020    .BYTE '          PHONE:  '
==77E0           2833    .BYTE '(312) 364-4810',$0D
                 0D
==77EF                   *=$77FA            ;
                 ;*****  VECTORS *****
==77FA VECT      5B75    .WORD NMI,POR,IRQ
                 3460
                 D074
                         .END
                 ERRORS= 0000
```

We claim as our invention:

1. A traffic control system for a drive-in bank or other installation comprising, a plurality of teller drive-in stations to which vehicles can be directed at which financial transactions can be performed, a plurality of teller control stations and a single teller in each of said teller control stations and each teller controlling one of said plurality of teller drive-in stations, a first plurality of vehicle detectors at said plurality of teller drive-in stations for detecting the presence of vehicles at said plurality of teller drive-in stations, at least one vehicle waiting lane in which vehicles waiting for service are parked, at least one vehicle waiting lane vehicle guiding sign at said vehicle lane, second waiting vehicle detectors at said vehicle waiting lane for detecting vehicles waiting for service in said waiting lane, and an electronic computer connected to said teller control stations, to said first plurality of vehicle detectors, to said waiting lane vehicle guidance sign and to said second vehicle detectors at said vehicle waiting lane to control and direct the flow of vehicles to said plurality of teller drive-in stations.

2. A traffic control system according to claim 1 including a supervisor's control station connected to said electronic computer to allow a supervisor to monitor and to control movement of vehicles waiting for service to said plurality of teller drive-in stations.

3. A traffic control system according to claim 2 including a plurality of indicators with each mounted adjacent to each of said plurality of teller drive-in stations and connected to said electronic computer and indicating whether a teller drive-in station is busy or open.

4. A traffic control system according to claim 1 including a printer connected to said electronic computer for printing out the activity at each of said plurality of teller control stations.

5. A traffic control system according to claim 1 including a keyboard connected to said electronic computer to allow a supervisor to input control command to said computer.

6. A traffic control system according to claim 3 including a flasher connected to said electronic computer and to said plurality of indicators to cause said indications to flash when the associated teller drive-in station is open.

7. A traffic control according to claim 3 including a timer connected to said electronic computer for varying time delays in said traffic control system.

8. A traffic control according to claim 7 wherein said timer has adjustable controls to allow time delays to be adjusted.

9. A traffic control system according to claim 1 including identical teller control station cables for each teller control station so that additional teller control stations can be added to the system.

10. A traffic control system according to claim 1 including identical vehicle guiding sign cables for each waiting lane guiding sign so that additional vehicle guiding signs can be added to the system.

11. A traffic control system according to claim 1 wherein said electronic computer stores the outputs of said second vehicle detectors in sequence.

12. A traffic control system according to claim 1 wherein a vehicle that has been waiting for the longest time at the head of one of the waiting lanes is directed to the first available teller station by said computer by actuating said vehicle waiting lane vehicle sign.

* * * * *